(12) United States Patent
Kondo et al.

(10) Patent No.: US 6,965,693 B1
(45) Date of Patent: Nov. 15, 2005

(54) IMAGE PROCESSOR, IMAGE PROCESSING METHOD, AND RECORDED MEDIUM

(75) Inventors: Tetsujiro Kondo, Tokyo (JP); Junichi Ishibashi, Saitama (JP)

(73) Assignee: Sony Corporation, Tokyo (JP)

( * ) Notice: Subject to any disclaimer, the term of this patent is extended or adjusted under 35 U.S.C. 154(b) by 740 days.

(21) Appl. No.: 09/807,705

(22) PCT Filed: Aug. 21, 2000

(86) PCT No.: PCT/JP00/05592

§ 371 (c)(1),
(2), (4) Date: Jun. 21, 2001

(87) PCT Pub. No.: WO01/15086

PCT Pub. Date: Mar. 1, 2001

(30) Foreign Application Priority Data

Aug. 19, 1999 (JP) .................................. 11/232246
Aug. 19, 1999 (JP) .................................. 11/232247

(51) Int. Cl.⁷ ............................................. G06K 9/46
(52) U.S. Cl. ...................... 382/190; 382/224; 382/291
(58) Field of Search ....................... 382/103, 118, 151, 382/159, 181, 190, 191, 209, 216, 218, 224, 382/278, 289, 291, 288; 348/169

(56) References Cited

U.S. PATENT DOCUMENTS 5,430,809 A * 7/1995 Tomitaka .................... 382/173
5,828,769 A * 10/1998 Burns ......................... 382/118
5,838,839 A * 11/1998 Seki et al. ................... 382/299
5,870,494 A * 2/1999 Kanda et al. ................ 382/197

FOREIGN PATENT DOCUMENTS

| JP | 1-106187 | 4/1989 |
| JP | 4-281578 | 10/1992 |
| JP | 9-35070 | 2/1997 |
| JP | 9-147119 | 6/1997 |

OTHER PUBLICATIONS

Su, et al. "Face recognition by feature orientation and feature geometry matching", IEEE, pp. 401-405, 1996.*
Hager, et al. "Efficient region tracking with parametric models of geometry and illumination", IEEE, pp. 1025-1039, 1998.*

* cited by examiner

Primary Examiner—Daniel Miriam
(74) Attorney, Agent, or Firm—Frommer Lawrence & Haug LLP; William S. Frommer; Thomas F. Presson

(57) ABSTRACT

A feature region is extracted from the image region of an object, in accordance with the luminance distribution of pixels adjacent to a predetermined pixel that exists in the image region of the object (S31 to S34). A gravity-center correlation value is calculated, which shows the correlation between the gravity center of the feature region and the gravity center of the image region of the object (S35 and S36). The orientation of the object is determined from the gravity-center correlation value (S37).

66 Claims, 31 Drawing Sheets

IMAGE PROCESSOR, IMAGE PROCESSING METHOD, AND RECORDED MEDIUM

TECHNICAL FIELD

The present invention relates to an image processing apparatus, an image processing method, and a medium. More particularly, the invention relates to an image processing apparatus, an image processing method and a recording medium, which can detect the posture of an object easily and reliably.

BACKGROUND ART

A method is known in which an object (a surface thereof) is photographed and the image data acquired by the photographing is examined, thereby detecting the direction in which that specific surface (hereinafter called "object surface") is orientated. Various methods may be employed to examine the image data. One of the methods is template mapping method. In the template mapping method, the image of the object surface photographed is compared with the images of the object surface, i.e., so-called templates, which have been photographed and stored, thereby to detect the similarity the image photographed now has with respected to the templates. That is, the object surface photographed now is regarded as orientated in the very direction in which the template of the highest similarity is orientated.

In the template mapping method, however, the similarity detected changes, once the features (e.g., position, rotation and size) of the image photographed have changed, even if the orientation (e.g., angle) of the object surface remains almost the same. Consequently, the orientation (angle) finally detected of the object surface may differ from the actual value. In other words, the template mapping method has but low robustness to the changes in the features of the image photographed.

A method is available, in which a search provided in the object surface is photographed by moving the photographing apparatus in parallel to the object surface and in a direction perpendicular thereto, and by performing zooming. The image data thus acquired is used, thereby detecting the similarity. Thus, the orientation (angle) of the object surface can be correctly detected even if the image photographed changes somewhat. In this method, however, the amount of data processed increases, and the calculation proportionally increases. The method is disadvantageous in that much time is required to detect the orientation of the object surface. There is another problem with the method. If any other part of the object surface, other than the search area, changes in its displayed state, the angle cannot be detected accurately.

With the template mapping method it is difficult to distinguish one part of the object surface form another of the same color, particularly when the entire image of the object surface has a low luminance. That is, parts of the same colors cannot be distinguished in accordance with the luminance of one of the pixels that constitute the image. For example, images of brown hair and brown eye can hardly be distinguished from each other. Since the image of the brown eye cannot be distinguished from that of the brown hair, it is impossible to detect the orientation of the face from the image of the eyes that are facial features more prominent than the hair. Further, the difference in pixel value between the image of the eye and the image of the skin differs, from person to person. For example, the difference is small for a person who has brown skin and brown eyes, whereas the difference is large for a person who has fair kin and brown eyes. The images of, for example, the eyes cannot be reliably extracted from the face images of all persons. Therefore, the template mapping method is disadvantageous for its low robustness to the changes in the features of the image photographed.

DISCLOSURE OF THE INVENTION

The present invention has been made in view of the foregoing. An object of the invention is to provide an image processing apparatus, an image processing method and a recording medium, which can detect the posture of an object easily and reliably even if the features of the image photographed of the object change.

An image processing apparatus according to the invention comprises: extracting means for extracting a feature region from a region of an object in image, in accordance with a luminance distribution of a plurality of pixels adjacent to a predetermined pixel; calculating means for calculating a gravity-center correlation value that shows the correlation between the gravity center of the feature region and the gravity center of the image region of the object; and determining means for determining an orientation of the object from the gravity-center correlation value.

Another image processing apparatus according to this invention comprises: extracting means for extracting a feature region from an image region of an object, in accordance with a luminance distribution of pixels adjacent to a predetermined pixel; classifying means for classifying each pixel included in the feature region into one of classes; distribution table generating means for generating an objective frequency distribution table which shows a frequency distribution of pixels in each class; and determining means for determining an orientation of the object in accordance with the objective frequency distribution table.

An image processing apparatus according to the present invention comprises: determining means for determining an orientation of an object; extracting means for extracting a feature region from a region of an object in each image which corresponds to an orientation of the object, in accordance with a luminance distribution of a plurality of pixels adjacent to a predetermined pixel existing in each image; calculating means for calculating a gravity-center correlation value that shows the correlation between the gravity center of the feature region and the gravity center of the region of the object in each image; and generating means for generating relation information which shows the relation between the gravity-center correlation value and an orientation of the object.

Another image processing apparatus according to the invention comprises: determining means for determining an orientation of an object; extracting means for extracting a feature region from a image region of the object in each image which corresponds to an orientation of the object, in accordance with a luminance distribution of a plurality of pixels corresponding to an predetermined pixel existing in each image; classifying means for classifying each pixel existing in the feature region, into one of classes; distribution generating means for generating a reference frequency distribution table which is a frequency distribution of a number of pixels, which are classified in the classifying means, in each class; gravity-center calculating means for calculating a gravity center of an image region consisting of pixels in each class, which pixels are classified in the classifying means; object gravity-center calculating means for calculating a gravity center of the image region of the object; gravity-center correlation calculating means for calculating a gravity-center correlation value that shows correlation between the gravity center of the feature region and the gravity center of the region of the object in each class; and relation information calculating means for calculating relation information values in accordance with the gravity-center correlation information value of each class, the reference frequency distribution table and the orientation of the object.

A further image processing apparatus according to the invention comprises: acquiring means for acquiring images of an orientation of an object, in association with information about an orientation of the object; extracting means for extracting a feature region from the image region of the object, for the orientation data, in accordance with a luminance distribution of a plurality of pixels corresponding to a predetermined pixel; classifying means for classifying each pixel existing in the feature region into one of classes; distribution table generating means for generating a frequency distribution table of a number of pixels, which pixels are classified in the classifying means, in each class; correlation generating means for generating a frequency-distribution correlation value that shows correlation between one distribution table called a reference histogram and at least one of the other distribution tables called objective histograms, which distribution tables are generated in the distribution generating means; and relation information generating means for generating relation information which shows relation between the frequency distribution correlation value and the orientation information.

An image processing method according to the present invention comprises the step of: extracting a feature region from a region of an object in image, in accordance with a luminance distribution of a plurality of pixels adjacent to a predetermined pixel; calculating a gravity-center correlation value that shows the correlation between the gravity center of the feature region and the gravity center of the image region of the object; and determining an orientation of the object from the gravity-center correlation value.

Another image processing method according to the invention comprises the steps of: extracting a feature region from an image region of an object, in accordance with a luminance distribution of pixels adjacent to a predetermined pixel; classifying each pixel included in the feature region into one of classes; generating an objective frequency distribution table which shows a frequency distribution of pixels in each class; and determining an orientation of the object in accordance with the objective frequency distribution table.

Still another image processing method according to this invention comprises the steps of: determining an orientation of an object; extracting a feature region from a region of an object in each image which corresponds to an orientation of the object, in accordance with a luminance distribution of a plurality of pixels adjacent to a predetermined pixel existing in each image; calculating a gravity-center correlation value that shows the correlation between the gravity center of the feature region and the gravity center of the region of the object in each image; and generating relation information which shows the relation between the gravity-center correlation value and an orientation of the object.

An image processing method according to this invention comprises the steps of: determining an orientation of an object; extracting a feature region from a image region of the object in each image which corresponds to an orientation of the object, in accordance with a luminance distribution of a plurality of pixels corresponding to an predetermined pixel existing in each image; classifying each pixel existing in the feature region, into one of classes; generating a reference frequency distribution table which is a frequency distribution of a number of pixels, which are classified in the classifying step, in each class; calculating a gravity center of an image region consisting of pixels in each class, which pixels are classified in the classifying step; calculating a gravity center of the image region of the object; calculating a gravity-center correlation value that shows correlation between the gravity center of the feature region and the gravity center of the region of the object in each class; and calculating relation information values in accordance with the gravity-center correlation information value of each class, the reference frequency distribution table and the orientation of the object.

An image processing method according to the invention comprises the steps of: acquiring images of an orientation of an object, in association with information about an orientation of the object; extracting a feature region from the image region of the object, for the orientation data, in accordance with a luminance distribution of a plurality of pixels corresponding to a predetermined pixel; classifying each pixel existing in the feature region into one of classes; generating a frequency distribution table of a number of pixels, which pixels are classified in the classifying step, in each class; generating a frequency-distribution correlation value that shows correlation between one distribution table called a reference histogram and at least one of the other distribution tables called objective histograms, which distribution tables are generated in the distribution generating step; and generating relation information which shows relation between the frequency distribution correlation value and the orientation information.

A recording medium according to the present invention records a computer-controllable program, said computer-controllable program comprising the steps of: extracting a feature region from a region of an object in image, in accordance with a luminance distribution of a plurality of pixels adjacent to a predetermined pixel; calculating a gravity-center correlation value that shows the correlation between the gravity center of the feature region and the gravity center of the image region of the object; and determining an orientation of the object from the gravity-center correlation value.

Another recording medium according to the invention records a computer-controllable program, said computer-controllable program comprising the steps of: extracting a feature region from an image region of an object, in accordance with a luminance distribution of pixels adjacent to a predetermined pixel; classifying each pixel included in the feature region into one of classes; generating an objective frequency distribution table which shows a frequency distribution of pixels in each class; and determining an orientation of the object in accordance with the objective frequency distribution table.

A recording medium according to this invention records a computer-controllable program, said computer-controllable program comprising the steps of: determining an orientation of an object; extracting a feature region from a region of an object in each image which corresponds to an orientation of the object, in accordance with a luminance distribution of a plurality of pixels adjacent to a predetermined pixel existing in each image; calculating a gravity-center correlation value that shows the correlation between the gravity center of the feature region and the gravity center of the region of the object in each image; and generating relation information which shows the relation between the gravity-center correlation value and an orientation of the object.

A further recording medium according to the invention records a computer-controllable program, said computer-controllable program comprising the steps of: determining an orientation of an object; extracting a feature region from a image region of the object in each image which corresponds to an orientation of the object, in accordance with a luminance distribution of a plurality of pixels corresponding to an predetermined pixel existing in each image; classifying each pixel existing in the feature region, into one of classes; generating a reference frequency distribution table which is a frequency distribution of a number of pixels, which are classified in the classifying step, in each class; calculating a gravity center of an image region consisting of pixels in each class, which pixels are classified in the classifying step; calculating a gravity center of the image region of the object; calculating a gravity-center correlation value that shows correlation between the gravity center of the feature region and the gravity center of the region of the object in each class; and calculating relation information values in accordance with the gravity-center correlation information value of each class, the reference frequency distribution table and the orientation of the object.

A recording medium according to the present invention records a computer-controllable program, said computer-controllable program comprising the steps of: acquiring images of an orientation of an object, in association with information about an orientation of the object; extracting a feature region from the image region of the object, for the orientation data, in accordance with a luminance distribution of a plurality of pixels corresponding to a predetermined pixel; classifying each pixel existing in the feature region into one of classes; generating a frequency distribution table of a number of pixels, which pixels are classified in the classifying step, in each class; generating a frequency-distribution correlation value that shows correlation between one distribution table called a reference histogram and at least one of the other distribution tables called objective histograms, which distribution tables are generated in the distribution generating step; and generating relation information which shows relation between the frequency distribution correlation value and the orientation information.

BEST MODE FOR CARRYING OUT THE INVENTION

The best modes for carrying out the present invention will be described in detail, with reference to the accompanying drawings.

Figure 1:
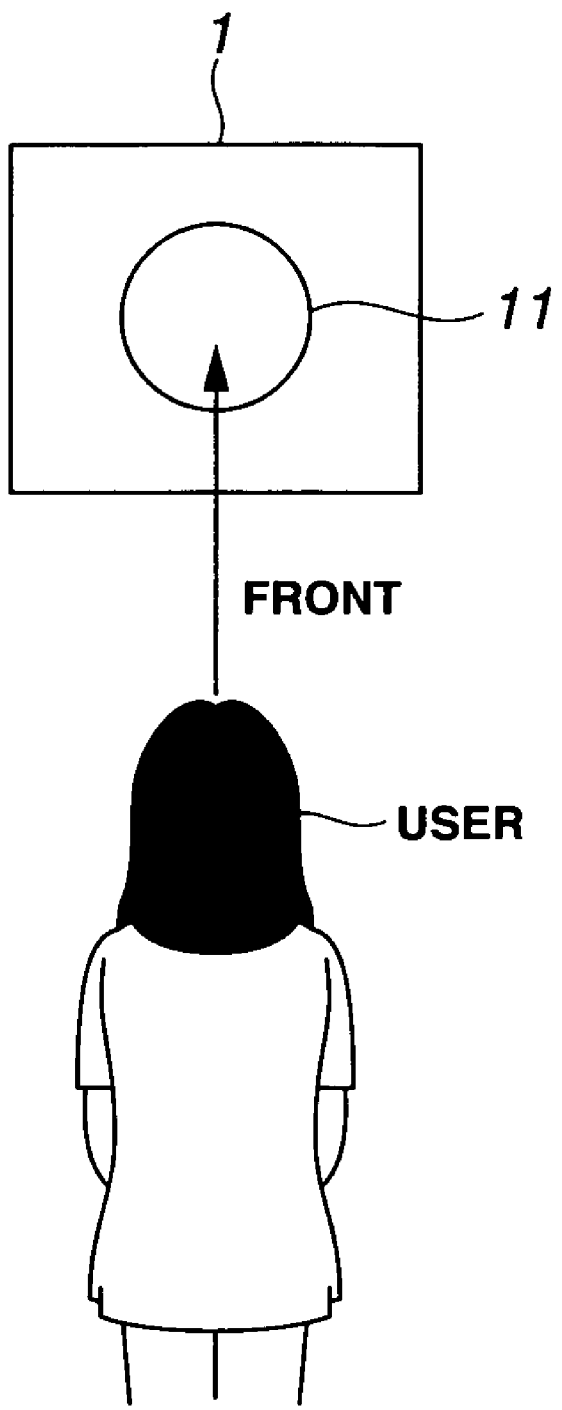
FIG. 1 is a diagram illustrating a method of using an image processing apparatus according to the present invention.

FIG. 1 shows a method of using the image processing apparatus 1 according to the present invention. The image processing apparatus 1 is arranged in front of the user (or above the user, in FIG. 1), thus opposite to the user. The apparatus 1 photographs the face of the user, generating image data, and detects the orientation (angle) of the user's face from the image data.

Figure 2A:
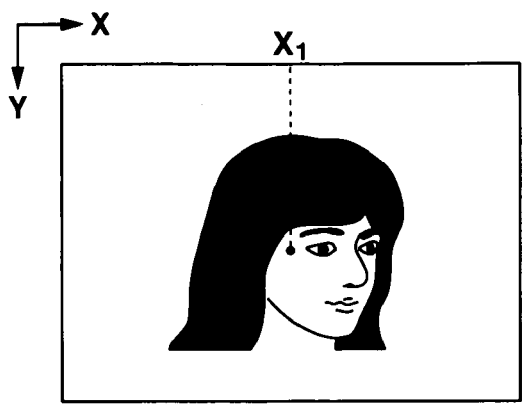
FIG. 2A, FIG. 2B, FIG. 2C and FIG. 2D show various positions the user's face may take.
Figure 2B:
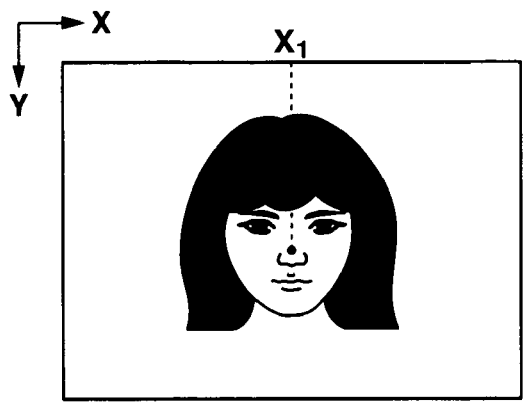
Figure 2C:
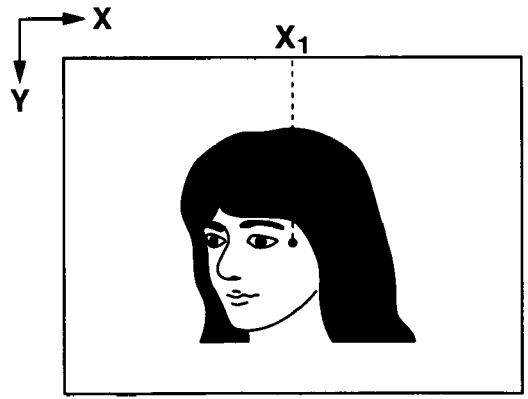
Figure 2D:
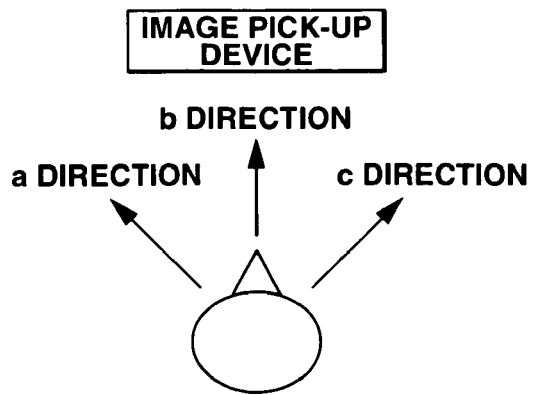

FIG. 2A shows the image of the user's face slightly turned to the left, or orientated in direction a (shown in FIG. 2D). FIG. 2B shows the image of the user's face facing straight the apparatus 1, or orientated in direction b (shown in FIG. 2D). FIG. 2C shows the image of the user's face a little turned to the right, or orientated in direction c (shown in FIG. 2D).

Figure 3:
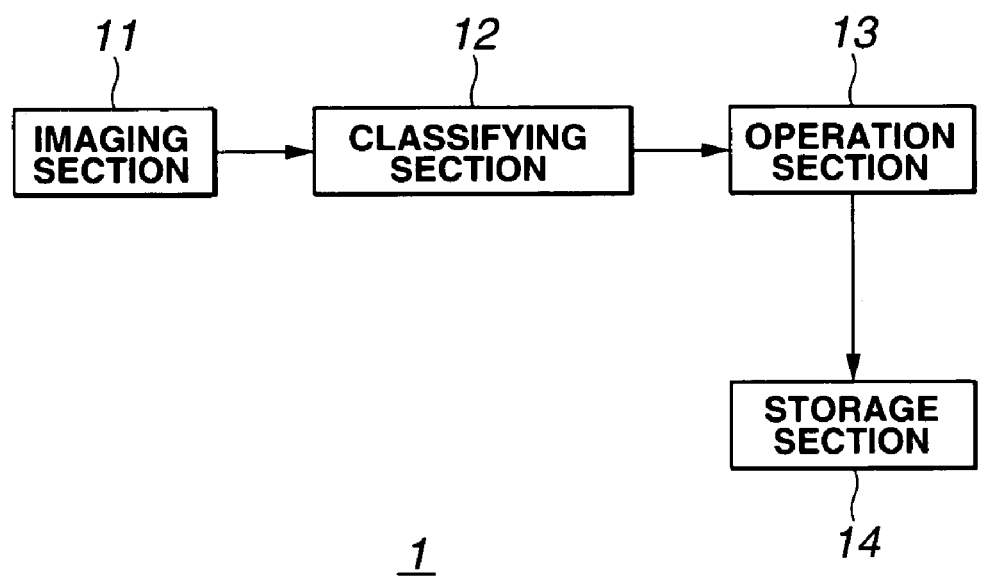
FIG. 3 is a block diagram showing the image processing apparatus.

FIG. 3 shows the image processing apparatus 1. The image processing apparatus 1 comprises an imaging section 11, a classifying section 12, an operation section 13, and a storage section 14. The imaging section 11 comprises a video camera or the like and photographs the user's face, generating image data that represents such an image as is shown in FIG. 2. The imaged data (hereinafter called "pre-classification image data") is output from the imaging section 11 to the classifying section 12.

The classifying section 12 classifies the image data generated by the imaging section 11, into feature regions (white parts) and non-feature regions (shaded parts) as is illustrated in FIG. 4. (Hereinafter, the pre-classification image data classified into the feature regions and the non-feature regions will be referred to as "feature-region classified image data".) The classifying section 12 supplies the feature-region classified image data to the operation section 13, along with the pre-classification image data output from the imaging section 11.

The regions classified as feature regions are the facial parts, such as the profile, the eyes, the nose and the mouth. These facial parts greatly change in position and shape in a plane as is seen from FIG. 2 when the orientation of the face changes. On the other hand, the regions classified as non-feature regions are the background and some other facial parts, such as the head and the forehead. These facial parts little change in position or shape in a plane when the orientation of the face changes.

Figure 4A:
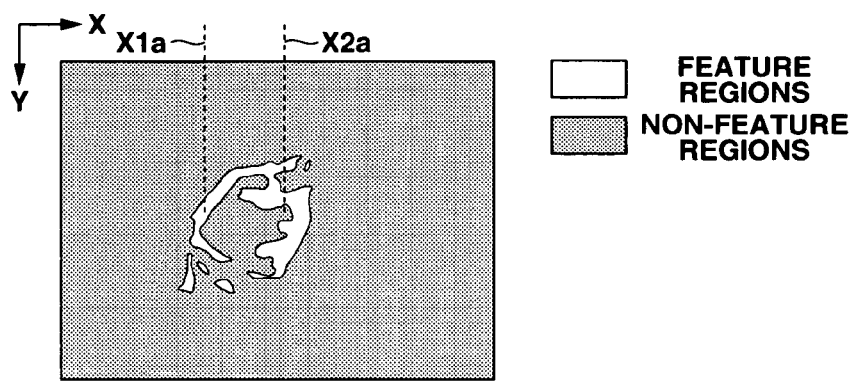
FIG. 4A, FIG. 4B and FIG. 4C are diagrams depicting three feature-region images that correspond to the images shown in FIG. 2A, FIG. 2B and FIG. 2C, respectively.
Figure 4B:
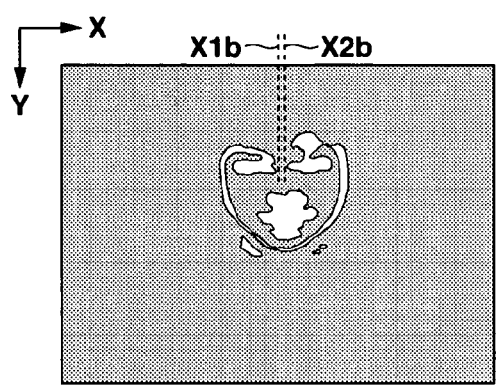
Figure 4C:
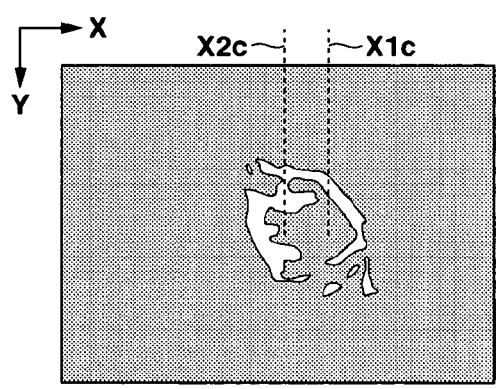

FIG. 4A shows the image (hereinafter called "feature-region classified image") that is represented by the feature-region classified image data based on the pre-classification image data generated by photographing the user's face shown in FIG. 2A. FIG. 4B depicts the feature-region classified image that is represented by the feature-region classified image data based on the pre-classification image data generated by photographing the user's face shown in FIG. 2B. FIG. 4C shows the feature-region classified image that is represented by the feature-region classified image data based on the pre-classification image data generated by photographing the user's face shown in FIG. 2C.

The operation section 13 determines the value $X_1$ for the gravity center $P_1$ of the face, located on the X axis (e.g., the number of pixels, counted from the left edge of the frame), from the pre-classification image data supplied from the classifying section 12. The operation section 13 also determines the value $X_2$ for the gravity center $P_2$ of the feature regions (i.e., white parts in FIG. 4), located on the X-axis, from the feature-region classified image data supplied from the classifying section 12. Further, the operation section 13 finds the difference D between the values $X_1$ and $X_2$ thus determined. The section 13 then detects the orientation (angle) of the user's face from the relation information shown in FIG. 5. The relation information has been acquired by performing a learning process and is stored in the storage section 14. The information will be described later in detail.

Figure 6:
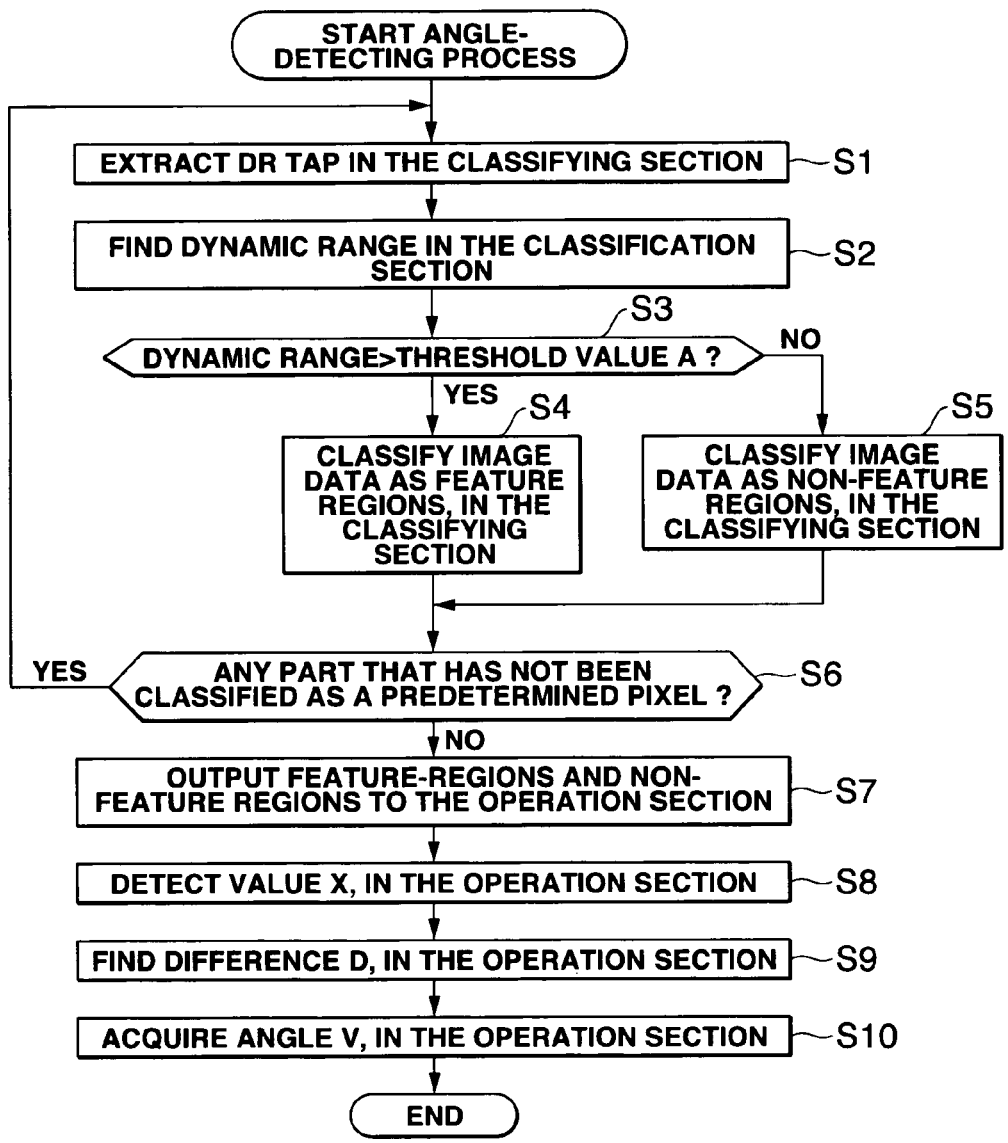
FIG. 6 is a flowchart explaining the process of detecting angles in the first embodiments of this invention.

The process of detecting the angle will be explained, with reference to the flowchart of FIG. 6.

The imaging section 11 photographs the user's face, generating image data. When the image data is supplied to the classifying section 12, the angle-detecting process starts.

Figure 7:
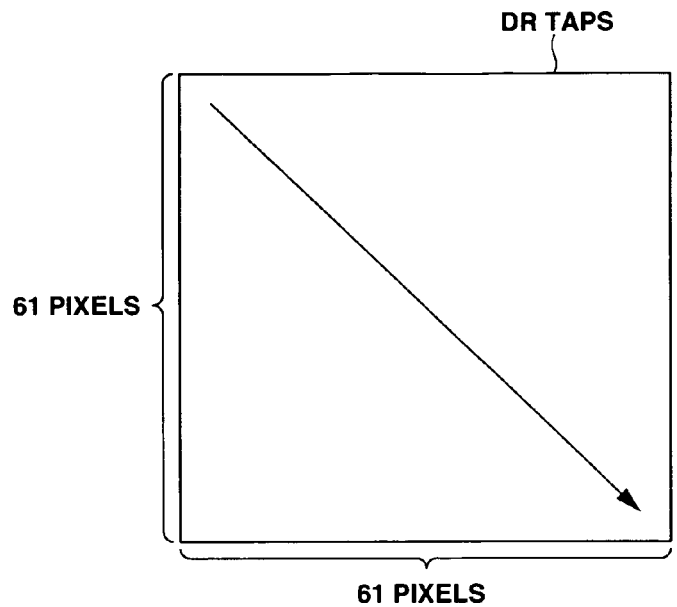
FIG. 7 is a diagram explaining a DR tap.

In Step S1, the classifying section 12 extracts a dynamic-range tap (called "DR tap" hereinafter) from the image data (i.e., one-frame image data) supplied from the imaging section 11. The DR tap is a region of, for example, 61×61 pixels as is illustrated in FIG. 7. In Step S2, the classifying section 12 extracts the pixel values from the DR tap it has extracted in Step S1. The section 12 then substitute the maximum pixel value and the minimum pixel value into the following equation, thereby calculating a dynamic range:

Dynamic rang=maximum pixel value−minimum pixel value

Next, in Step S3, the classifying section 12 determines whether the dynamic range calculated in Step S2 is greater than a threshold value A (e.g., 50) or not. If the dynamic range is greater than the threshold value, the process goes to Step S4. In Step S4, the section 12 classifies the pixels contained in the dynamic range, into feature regions (i.e., white parts shown in FIG. 4). If the dynamic range is smaller than the threshold value, the process goes to Step S5. In Step S5, the section 12 classifies the pixels contained in the dynamic range, into non-feature regions (i.e., shaded parts shown in FIG. 4).

After the pixels are classified into feature regions in Step S4, and into non-feature regions in Step S5, the process goes to Step S6. In Step S6 the classifying section 12 determined whether the pre-classification image data contains any part that has not been classified as a DR tap. In other words, the classifying section 12 determines whether any data item has been classified as neither a feature-region nor a non-feature region. If the section 12 determines that the image data contains such a part, the process returns to Step S1. In this case, the classifying section 12 extracts a new DR tap and then performs the steps following Step S1.

In Step S6, the section 12 may determine that the image data does not contain any part that has not been processed as predetermined pixels. That is, it may be determined that the pre-classification image data supplied from the imaging section 11 has been classified into feature-regions and non-feature regions as is shown in FIG. 4. In this case, the process goes to Step S7. In Step S7, the classifying section 12 outputs the feature-region classified image data to the operation section 13, along with the pre-classification image data.

In Step S8, the operation section 13 determines the gravity center $P_2$ of the feature regions represented by the feature-region classified image data supplied from the classifying section 12. The section 13 then finds the X-axis coordinate $X_2$ of the gravity center $P_2$. More precisely, the section 13 detects value $X_{2a}$ for the image of FIG. 4A, value $X_{2b}$ for the image of FIG. 4B, and value $X_{2c}$ for the image of FIG. 4C. Moreover, the operation section 13 determines the gravity center $P_1$ of the non-feature regions represented by the feature-region classified image data supplied from the classifying section 12. The section 13 then finds the X-axis coordinate $X_1$ of the gravity center $P_1$. To be more specific, the section 13 detects value $X_{1a}$ for the image of FIG. 4A, value $X_{1b}$ for the image of FIG. 4B, and value $X_{1c}$ for the image of FIG. 4C.

Then, in Step S9, the operation section 13 calculates the difference D (e.g., in terms of number of pixels) between the values $X_1$ and $X_2$ of each set, in accordance with the following equation:

$$\text{Difference } D = \text{value } X_1 - \text{value } X_2 \qquad (1)$$

Thus, difference Da is obtained for the image of FIG. 4A, difference Db for the image of FIG. 4B, and difference Dc for the image of FIG. 4C.

Figure 5:
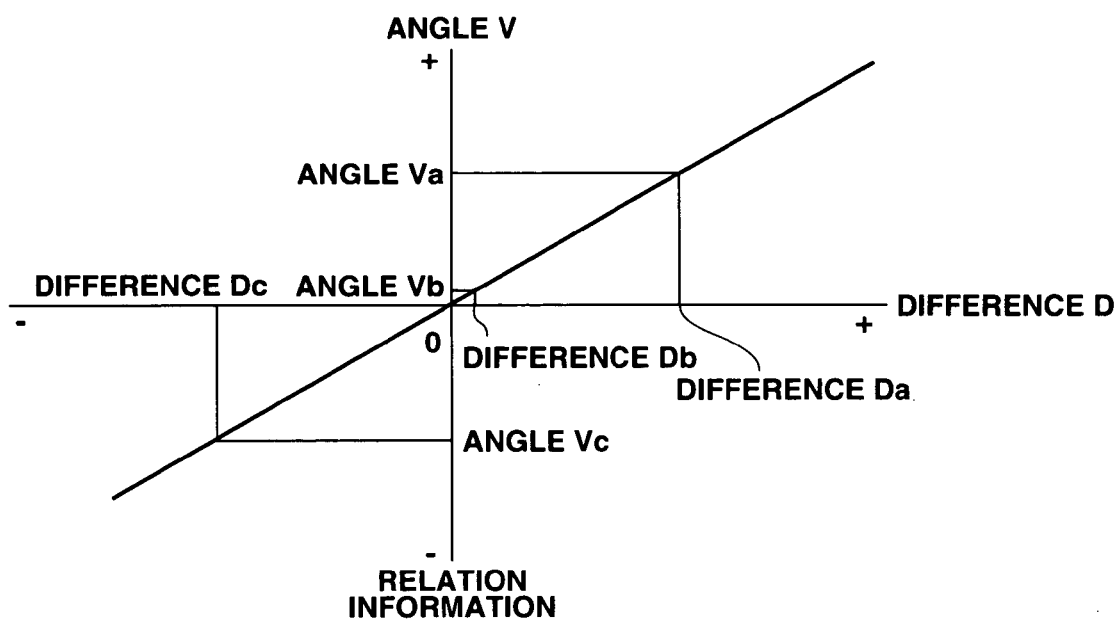
FIG. 5 is a diagram illustrating relation information items.

In Step S10, the operation section 13 refers to the relation information of FIG. 5, which is stored in the storage section 14 and indicates the relation between angle V and difference D, thereby detecting the angle V that corresponds to the difference D. More specifically, the section 13 detects an angle Va corresponding to the difference Da for the image of FIG. 4A, an angle Vb corresponding to the difference Db for the image of FIG. 4B, and an angle Vc corresponding to the difference Dc for the image of FIG. 4C. In the case of the relation information illustrated in FIG. 5, if the angle V has a positive value, it means that the user's face is orientated by the angle to the left with respect to the imaging section 11. If the angle V has a negative value, it means that the user's face is orientated by the angle to the right. That is, the image of FIG. 4A is of the user's face turned to the left by the angle |Va | with respect to the imaging section 11. The image of FIG. 4B is of the user's face turned to the left by the angle |Vb | with respect to the front position. (For image of FIG. 4B, however, the angle Vb is almost 0°.) Therefore, the user's face opposes straight the imaging section 11.) The image of FIG. 4C is of the user's face turned to the right by the angle |Vc | with respect to the front position. Thus, the images of FIGS. 4A, 4B and 4C are identical to the images shown in FIGS. 2A, 2B and 2C, respectively, in terms of the orientation of the user's face.

Figure 8:
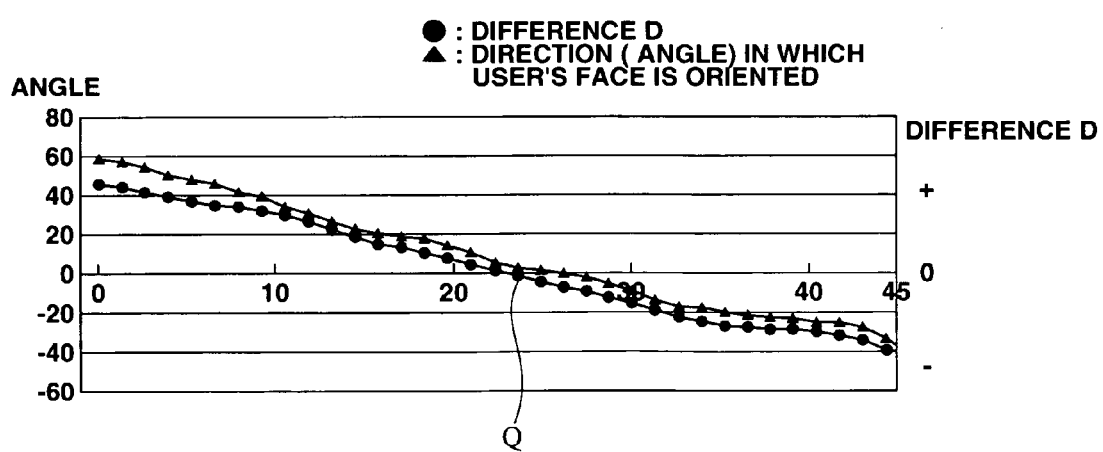
FIG. 8 is a graph showing difference D and the direction in which the face is orientated.

Note that the relation information shown in FIG. 5 has been generated from the relation between the difference D and the orientation (angle) of the user's face, and that the difference D has derived from the image data representing the user's face turned to a specific direction. FIG. 8 shows the relation between the difference D and the angle of orientation of the user's face. The relation shown has been determined by photographing the user's face 45 times at regular intervals, as the face turns from a state orientated by about 60° to the right to a state orientated by about 40° to the left, with respect to the front position. The differences D (circles) and orientation angles (triangles) that have been obtained for the 45 image data items generated by photographing are plotted in FIG. 8.

As seen from FIG. 8, the image-data point Q indicates the image data that represents the image of the user's face assuming almost front position (that is, the face is orientated by 0° with respect to the front position). The difference D for this image data is almost 0. This is because the value $X_1$ for the gravity center $P_1$ of the image of the face is almost equal to the value $X_2$ for the gravity center $P_2$ of the feature regions.

This is how the angle of orientation of the user's face is detected in the first embodiment of the present invention.

The pixel values of the eyes (e.g., brown eyes) greatly change, because the sclera (white) and the skin (skin color) surround the eyes. The dynamic range of these pixel values is broad. That is to say, the images of the brown eyes are classified as feature-regions. By contrast, the pixel values of the brown hair do not change so much, and the dynamic range of these pixel values is narrow. Hence, the image of the hair is classified as a non-feature-region. In this manner, dynamic range of DR taps is calculated for the prescribed image region (i.e., 61×61 pixels). The image data is classified in accordance with the dynamic range thus calculated. Therefore, the brown eyes are classified as feature regions, whereas the brown hair is classified as a non-feature region, though the eyes and the hair are of the same color. This makes it possible to detect the orientation of the face based on the feature regions.

The user may have brown skin and brown eyes. In this case, too, the brown eyes are classified as feature regions since the sclera (white) surrounds the either eye, just in the same way for a person who has brown eyes and fair skin. Thus, the eyes, the mouth and the like can be classified as feature regions, whichever skin color the user has, only if their dynamic range of luminance is detected. The orientation of the face can therefore be detected accurately.

The threshold value A is 50 as described above. Nonetheless, the threshold value A may be 40, 60, 70 or 80. If so, similar facial parts can be classified as feature regions and extracted as such, whichever luminance, high or low, the entire image of the face may have.

As mentioned above, the operation section 13 does refer to the relation information of FIG. 5, detecting the angle V that corresponds to the difference D. Instead, the relation between the difference D and the angle V may be utilized to detect the orientation of the user's face. As mentioned above, the value X the gravity center has in the X-axis direction is applied, in order to detect the orientation of the face. Nevertheless, the value Y that the gravity center has in the Y-axis direction may be applied, thereby to detect the orientation of the face. Moreover, the image processing apparatus 1 described above may be used, not only to detect the orientation of the user's face, but also to detect the orientation or posture of any other thing (for example, a doll).

The learning process of acquiring the relation information that is stored in the storage section 14 of the image processing apparatus 1 will now be explained.

The relation information is generated from the data (angle) representing the orientation of the user and the data representing the image of the user. To acquire the relation information at high efficiency, a plurality of image processing apparatuses identical to the apparatus 1 are arranged, which have prescribed positional relations (angels) with respect to the user.

Figure 13:
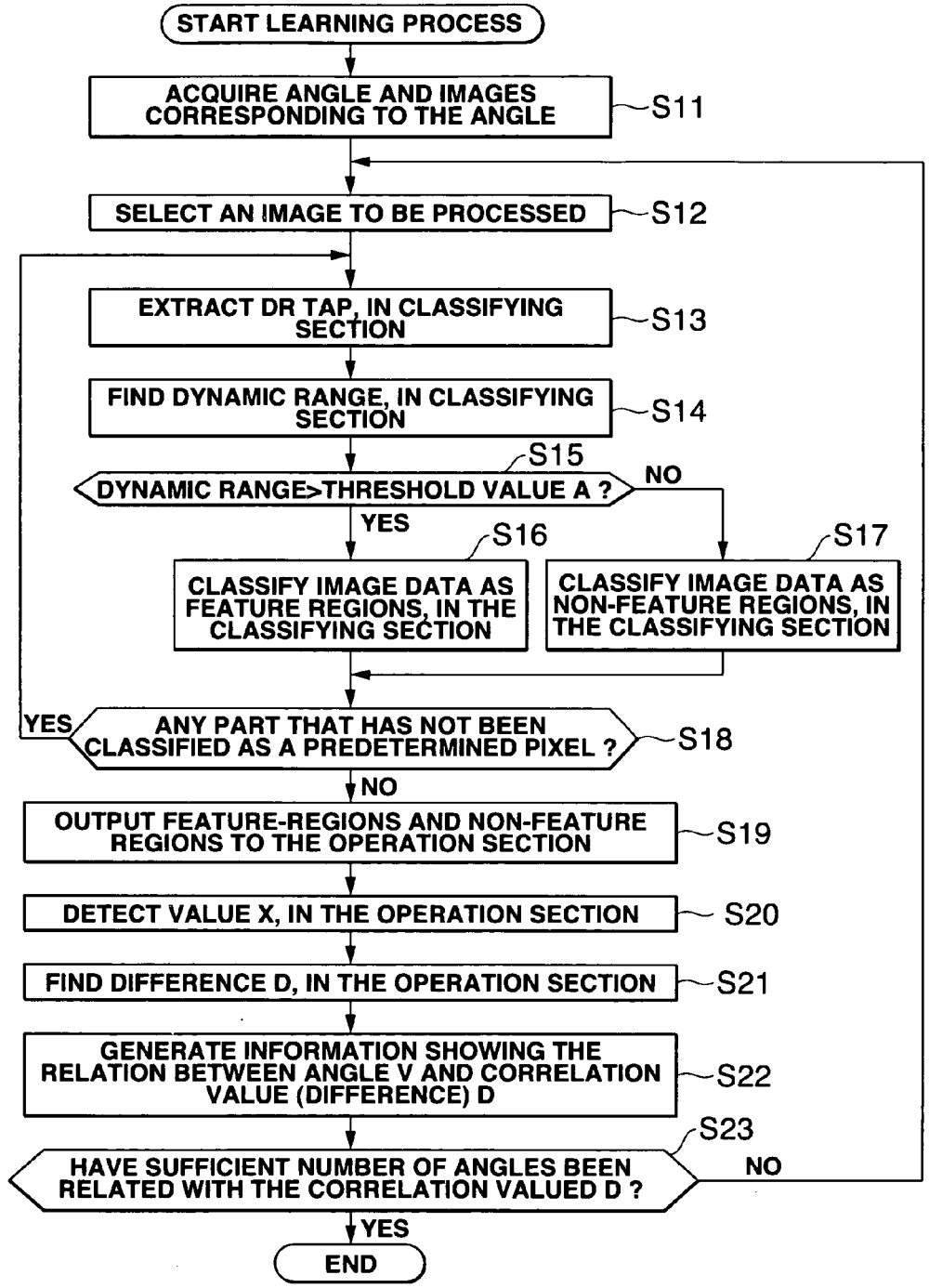
FIG. 13 is a flowchart explaining the learning process that is performed to generate relation information items in the first embodiment of the invention.

The learning process is effected to generate the relation information, as will be described with reference to the flowchart of FIG. 13.

In the learning process for generating the relation information, a plurality of images corresponding to each angle V are acquired together with the angle A, in Step S11.

In the next step, i.e., Step S12, an image is selected to be processed.

The image selected is processed in the following Steps S13 to S21, which are identical to Steps S1 to S9 shown in the flowchart of FIG. 6.

In Step S22, related information is generated, which represents the relation between the angle V and the correlation value (difference) D.

In the next step, i.e., Step S23, it is determined whether a sufficient number of angles have been related with the correlation value D. If NO, the process returns to Step S11, whereby Steps S11 to S22 are repeated. If YES, the learning process for generating the relation information is terminated.

The relation information can be corrected by arranging a plurality of image processing apparatuses identical to the apparatus 1, which have predetermined positional relations (angels) with respect to the user.

Figure 9:
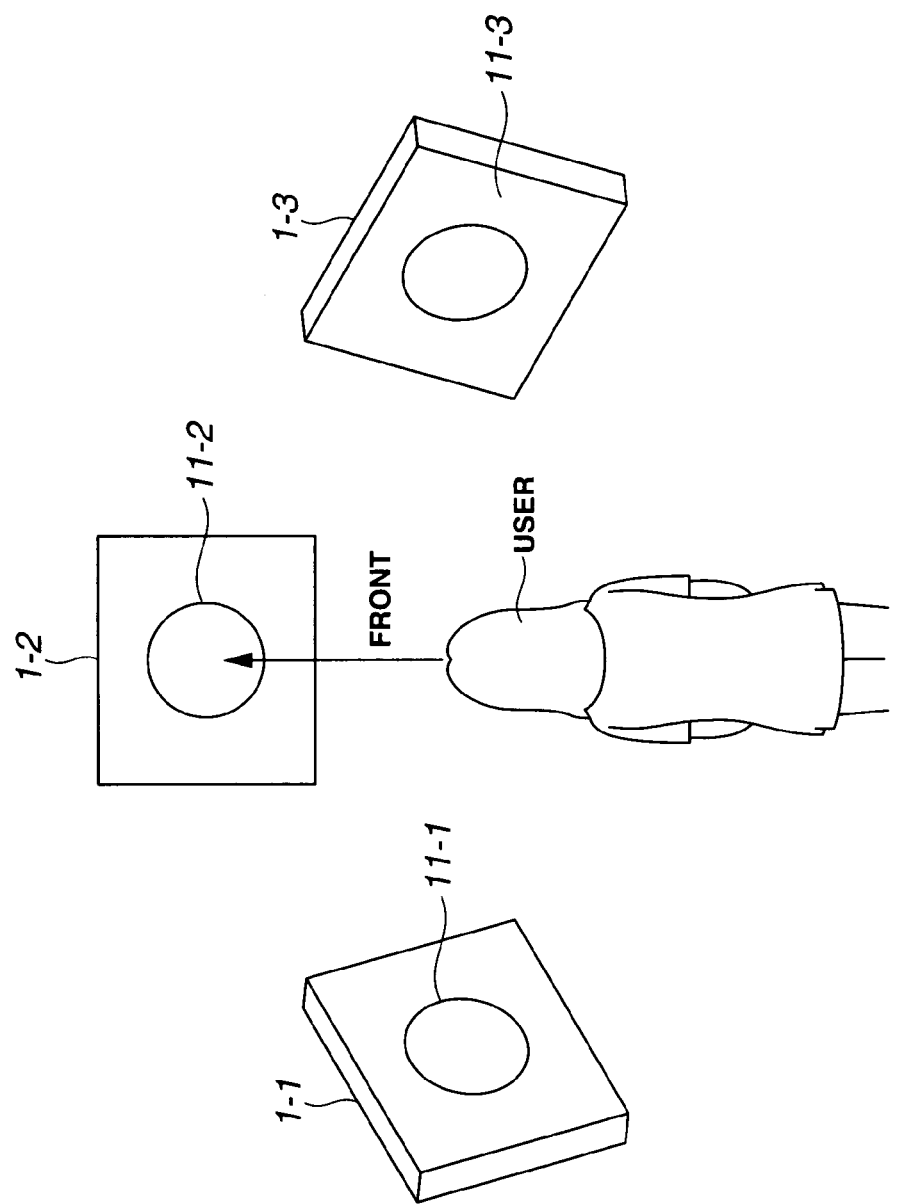
FIG. 9 is a diagram illustrating another method of using the image processing apparatus.

In the method illustrated in FIG. 9, three image processing apparatuses 1-1, 1-2 and 1-3 are arranged. The image processing apparatus 1-2 opposes the user, taking a so-called "front position," as shown in FIGS. 10 to 12. The image processing apparatus 1-2 is located, taking a so-called "left 45° position" with respect to the user. The image processing apparatus 1-3 is located, taking a so-called "right 45° position" with respect to the user.

Figure 10A:
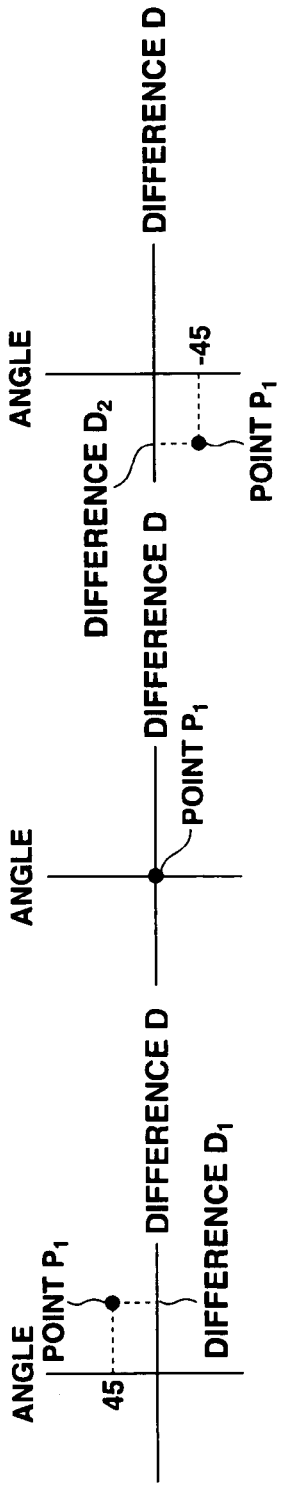
FIG. 10A and FIG. 10B are diagrams explaining how to generate relation information items.
Figure 10B:
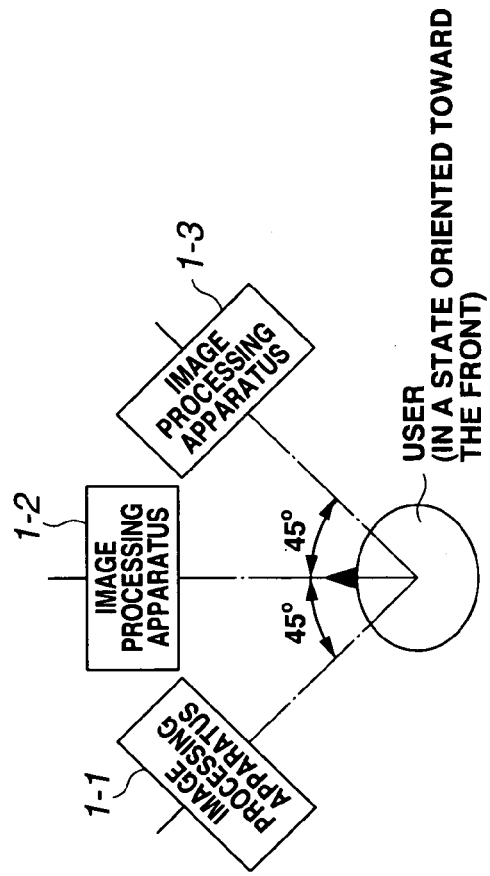

When the image processing apparatuses 1-1, 1-2 and 1-3 perform Steps S1 to S9 while the user keeps assuming the front position (facing the apparatus 1-2) as shown in FIG. 10B, the apparatuses 1-1, 1-2 and 1-3 find difference D1, difference D (=0) and difference D2, respectively, as is illustrated in FIG. 10A. Further, the image processing apparatus 1-1 detects a point defined by the difference D1 and the angle V (=45°). Similarly, the image processing apparatus 1-2 detects a point defined by the difference D (=0) and the angle V (=0°), and the image processing apparatus 1-3 detects a point defined by the difference D2 and the angle V (=−45°). Hereinafter, the point detected by the image processing apparatus 1 shall be referred to as "point $P_1$."

Figure 11A:
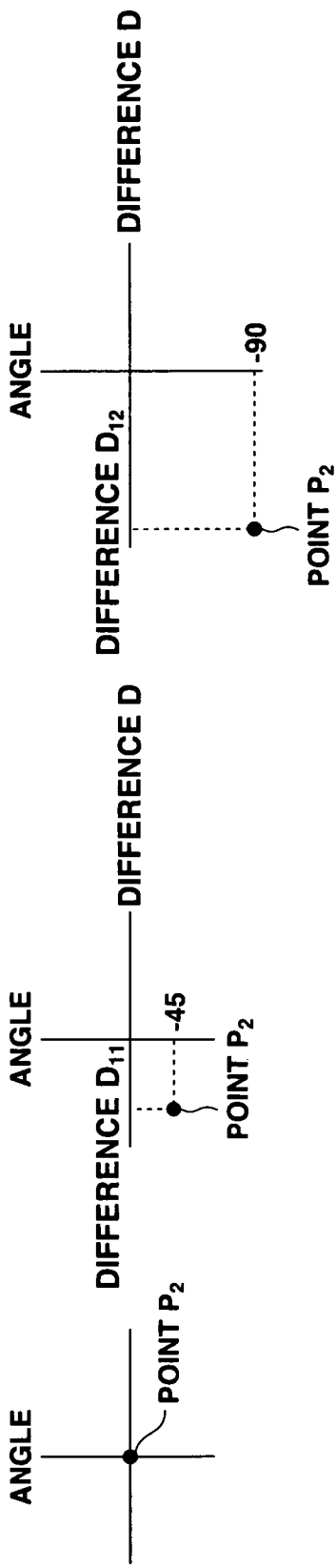
FIG. 11A and FIG. 11B are other diagrams that explain how to generate relation information items.
Figure 11B:
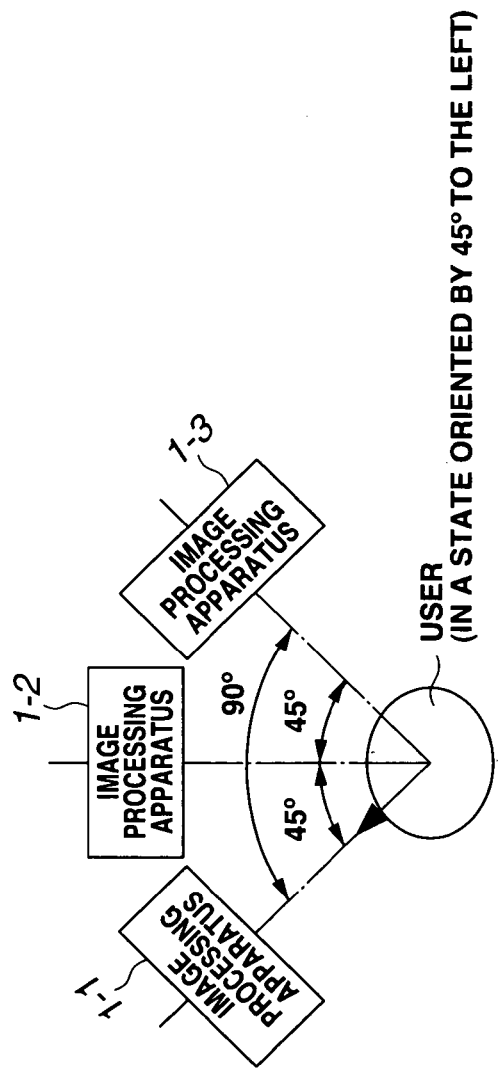

When the image processing apparatuses 1-1, 1-2 and 1-3 perform Steps S1 to S9 while the user keeps assuming the left 45° position (facing the apparatus 1-1) as shown in FIG. 11B, the apparatuses 1-1, 1-2 and 1-3 find difference D (=0), difference $D_{11}$, and difference $D_{12}$, respectively, as is illustrated in FIG. 11A. In this case, the image processing apparatus 1-1 detects a point defined by the difference D (=0) and the angle V (=0°). Similarly, the image processing apparatus 1-2 detects a point defined by the difference D11 and the angle V (=−45°), and the image processing apparatus 1-3 detects a point defined by the difference $D_{12}$ and the angle V (=−90°). Hereinafter, the point detected by the image processing apparatus 1 shall be referred to as "point $P_2$."

Figure 12A:
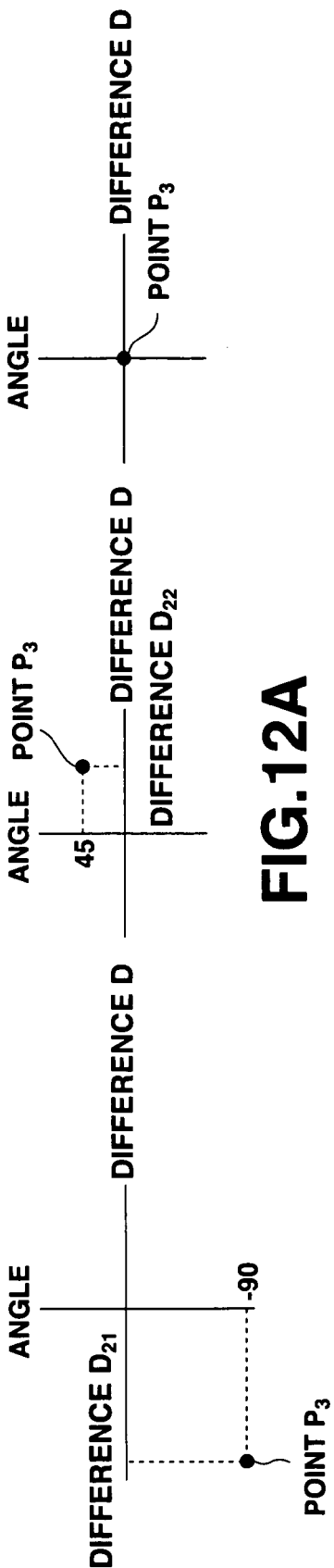
FIG. 12A and FIG. 12B are still other diagrams that explain how to generate relation information items.
Figure 12B:
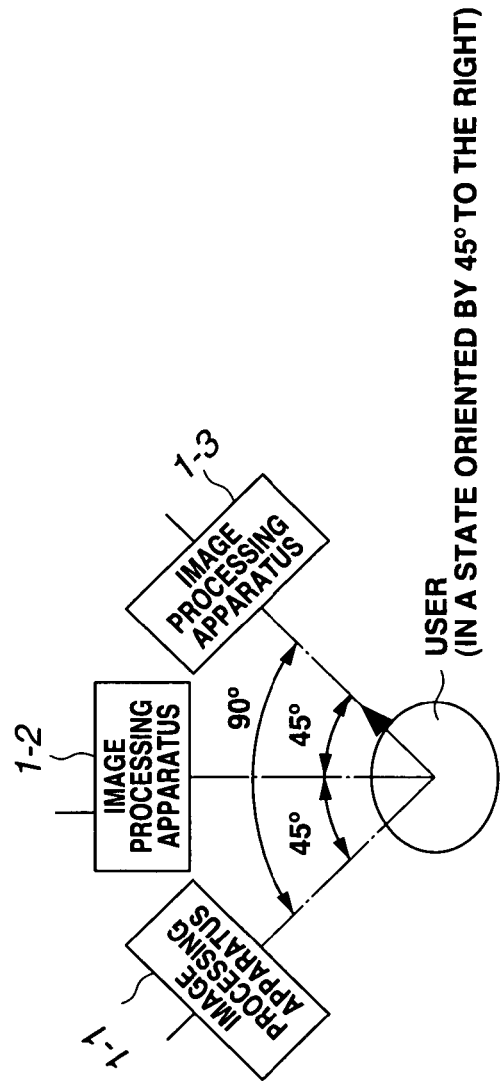

When the image processing apparatuses 1-1, 1-2 and 1-3 perform Steps S1 to S9 while the user keeps assuming the right 45? position (facing the apparatus 1-3) as shown in FIG. 12B, the apparatuses 1-1, 1-2 and 1-3 find difference $D_{21}$, difference $D_{21}$, and difference D (=0), respectively, as is illustrated in FIG. 12A. In this case, the image processing apparatus 1-1 detects a point defined by the difference $D_{21}$, and the angle V (=−90°). Similarly, the image processing apparatus 1-2 detects a point defined by the difference $D_{22}$ and the angle V (=45°), and the image processing apparatus 1-3 detects a point defined by the difference D (=0) and the angle V (=0°). Hereinafter, the point detected by the image processing apparatus 1 shall be referred to as "point $P_3$."

Once each image processing apparatus 1 detects points $P_1$, $P_2$ and $P_3$, these points are subjected to linear approximation. The relation information is updated by the results of the linear approximation and is thereby corrected.

In an image processing apparatus 1 according to the second embodiment of the invention, the classifying section 12, operation section 13 and storage section 14 may cooperate to carry out the following process.

Figure 14:
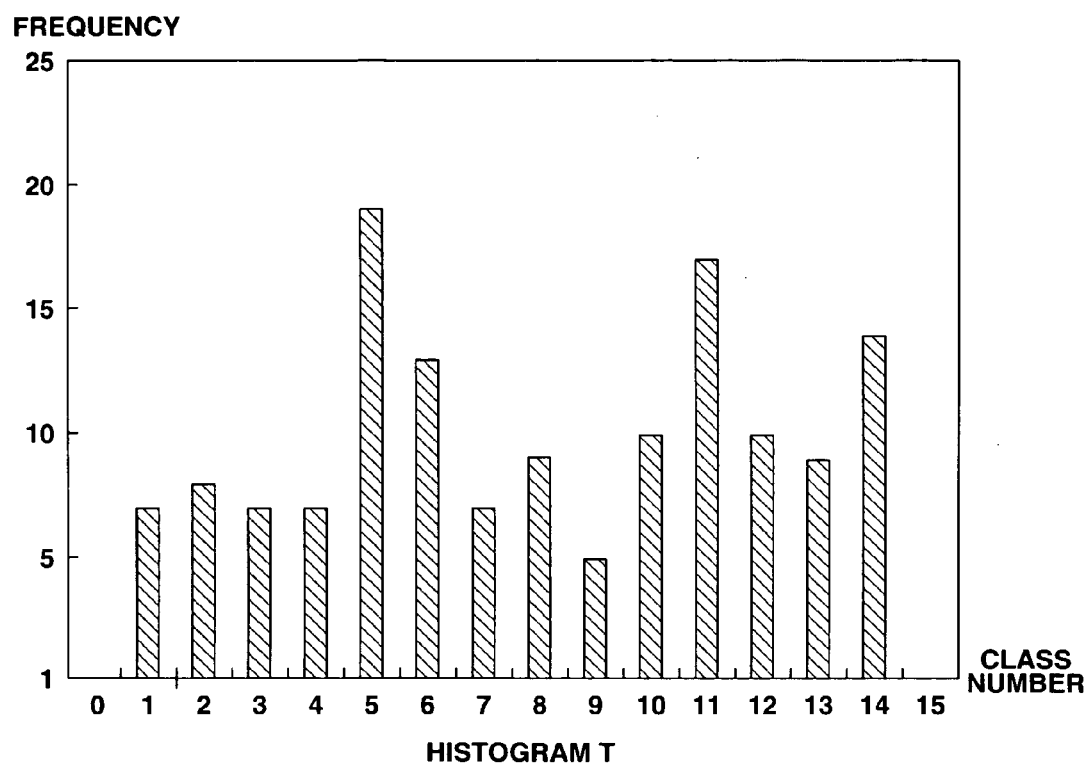
FIG. 14 is a graph showing histogram T that is generated in the second embodiment of the present invention.

In the second embodiment, the classifying section 12 generates feature-region classified image data from the pre-classification image data supplied from the imaging section 11, in the same way as in the image processing apparatus 1. The classifying section 12 also performs class-number allocation, which will be described later, thereby classifying feature regions into a plurality of classes (i.e., 16 classes, in this embodiment). Further, the classifying section 12 generates a histogram T from the classes of the feature regions. As shown in FIG. 14, the histogram T represents the number of regions (DR taps) of each of the sixteen classes (i.e., classes 0 to 15, in this case), or the frequency of each class.

Figure 15:
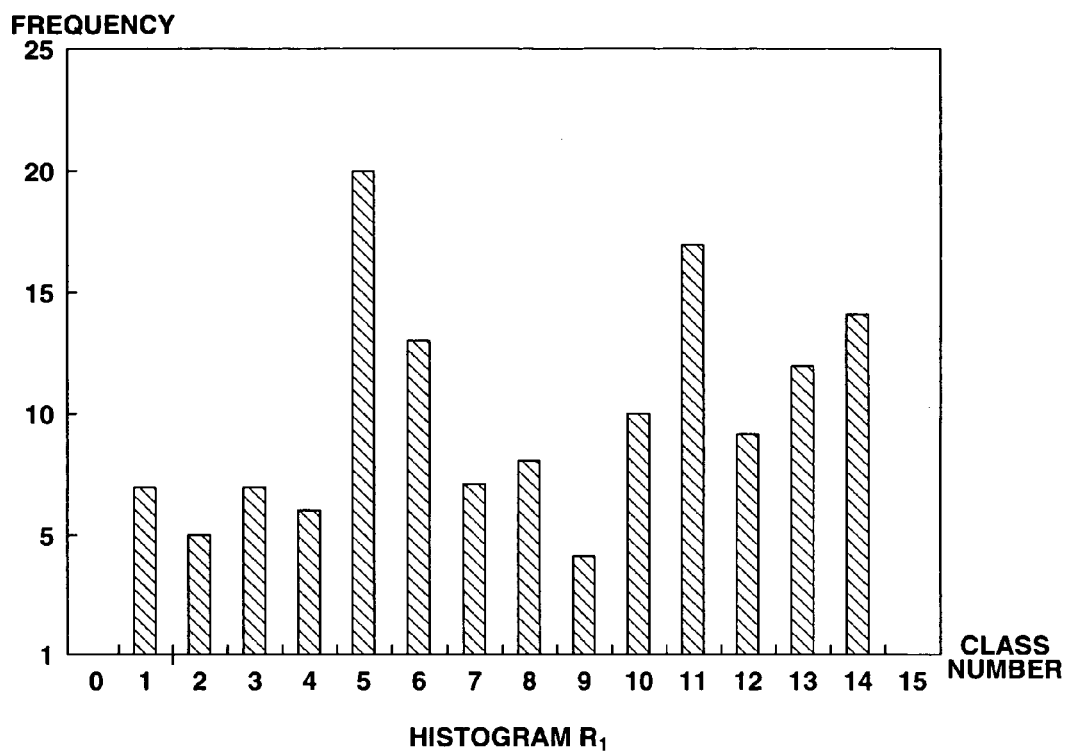
FIG. 15 is a graph illustrating histogram $R_1$.
Figure 16:
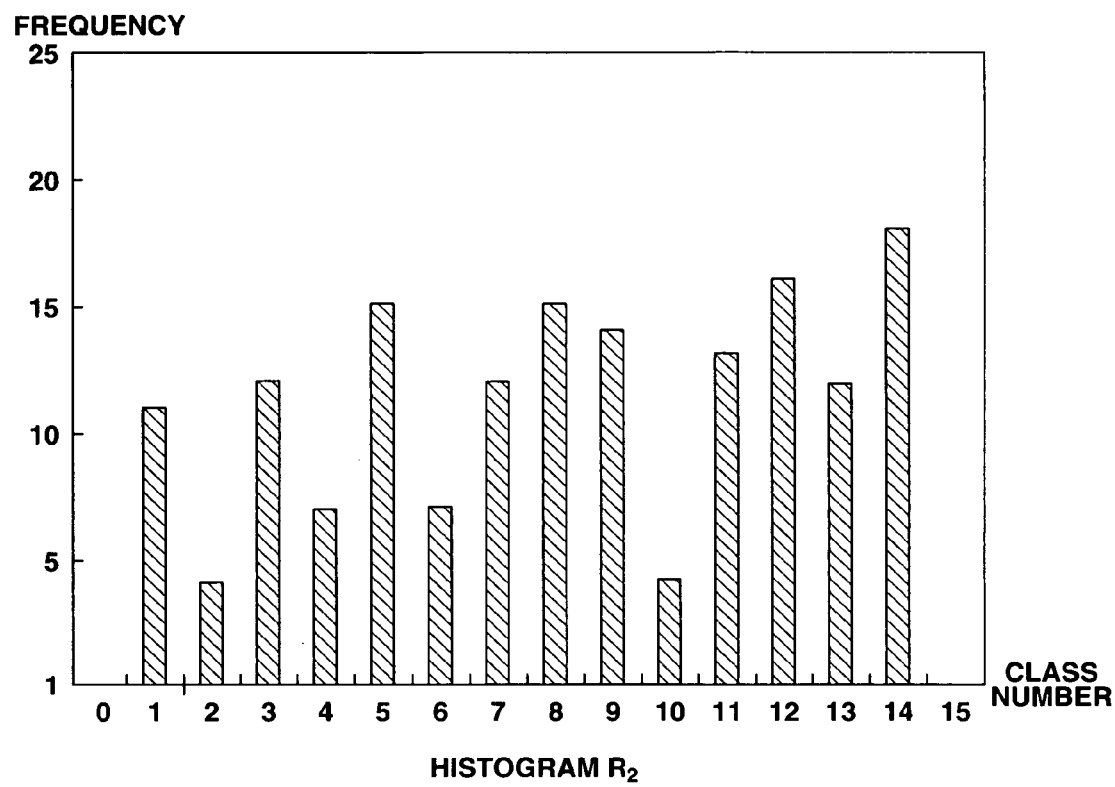
FIG. 16 is a graph showing histogram $R_2$.
Figure 17:
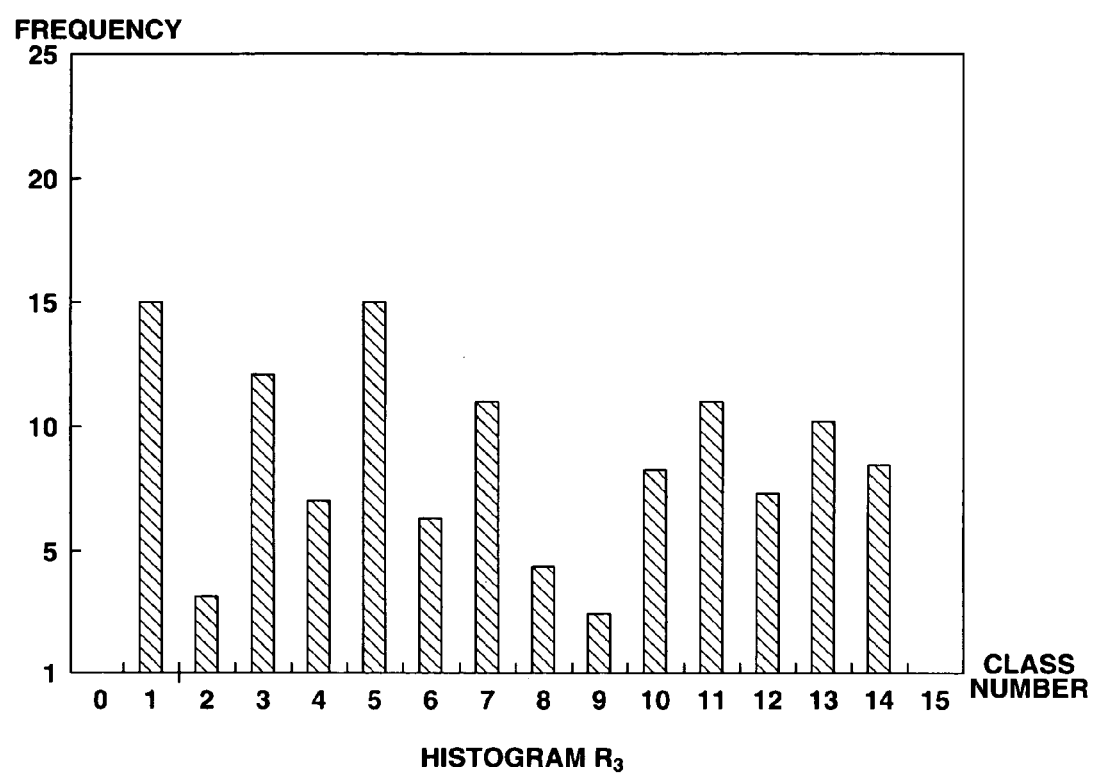
FIG. 17 is a graph illustrating histogram $R_3$.

The storage section 14 stores reference histograms (three histograms $R_1$, $R_2$ and $R_3$ in total). The histogram $R_1$ corresponds to image data representing the user's face turned to the right by 90° with respect to the front position. The histogram $R_2$ corresponds to image data showing the user's face in the front position. The histogram $R_3$ corresponds to image data showing the user's face turned to the left by 90° with respect to the front position. FIG. 15 shows the histogram $R_1$ based on the image data representing the user's face turned to the right by 90° with respect to the front position. FIG. 16 depicts the histogram $R_2$ based on the image data showing the user's face in the front position. FIG. 17 shows the histogram $R_3$ based on the image data showing the user's face turned to the left by 90° with respect to the front position.

The operation section 13 calculates the value of correlation between the histogram T supplied from the classifying section 12, on the one hand, and the reference histograms $R_1$, $R_2$ and $R_3$ stored in the storage section 14, on the other hand. The section 13 then detects the orientation (angle) of the user's face from the correlation value it has calculated.

How the section 13 detects the angle in the second embodiment will be explained, with reference to the flowchart of FIG. 18.

When the classifying section 12 receives the image data from the imaging section 11, it performs, in Step S31, steps identical to Steps S1 to S6 (FIG. 6) carried out in the first embodiment, thereby generating feature-region classified image data. In other words, the section 12 extracts feature regions having a broad dynamic range (i.e., parts representing the facial features of the user).

Figure 19:
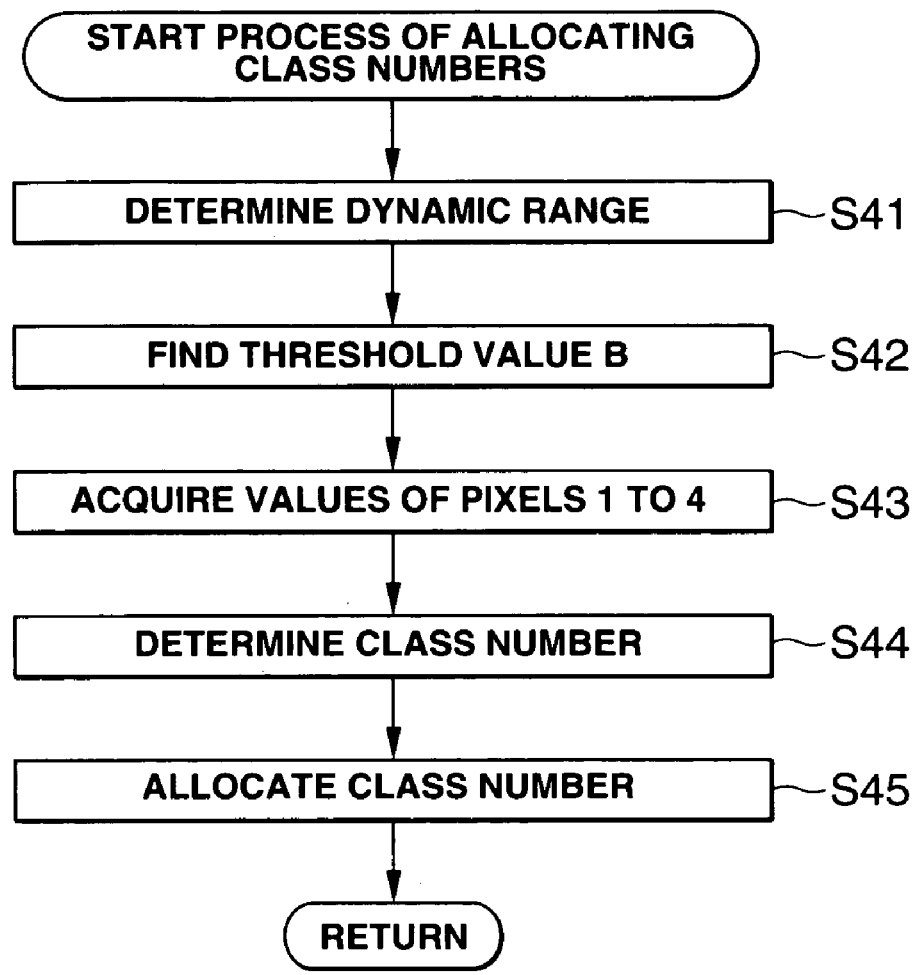
FIG. 19 is a flowchart explaining the process of allocating class numbers.

In Step S32, the classifying section 12 extracts a DR tap from the feature regions of the feature-region classified imaged data generated in Step S21. In Step S33, the section 12 allocates a class number to the DR tap it has extracted. The flowchart of FIG. 19 illustrates the process of allocating the class number to the DR tap.

Figure 18:
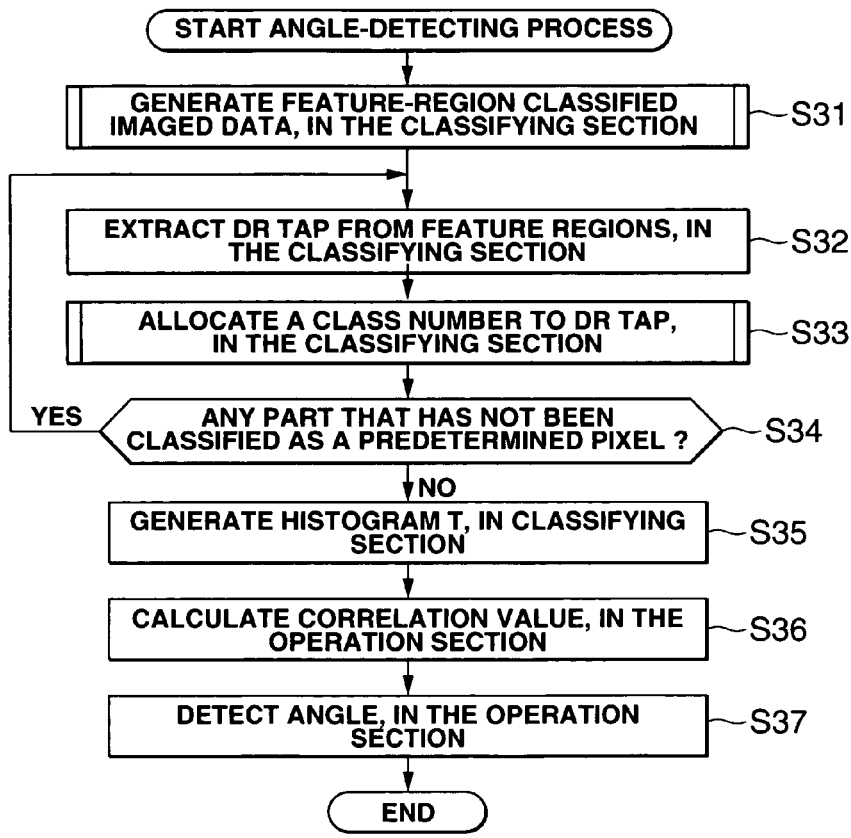
FIG. 18 is a flowchart explaining the process of detecting angles in the second embodiments of this invention.

That is, in Step S41, the classifying section 12 determines the dynamic range of the DR tap extracted in Step S22 of FIG. 18. In Step S42, the section 12 substitute the dynamic range in the following equation, thereby finding threshold value B. Note that the DR tap may be replaced by a DR tap obtained when the feature regions are extracted.

Threshold value B=minimum value+dynamic range/K where K is a constant and the minimum value is the smallest pixel value contained in the DR tap that has been extracted in Step S22.

Figure 20:
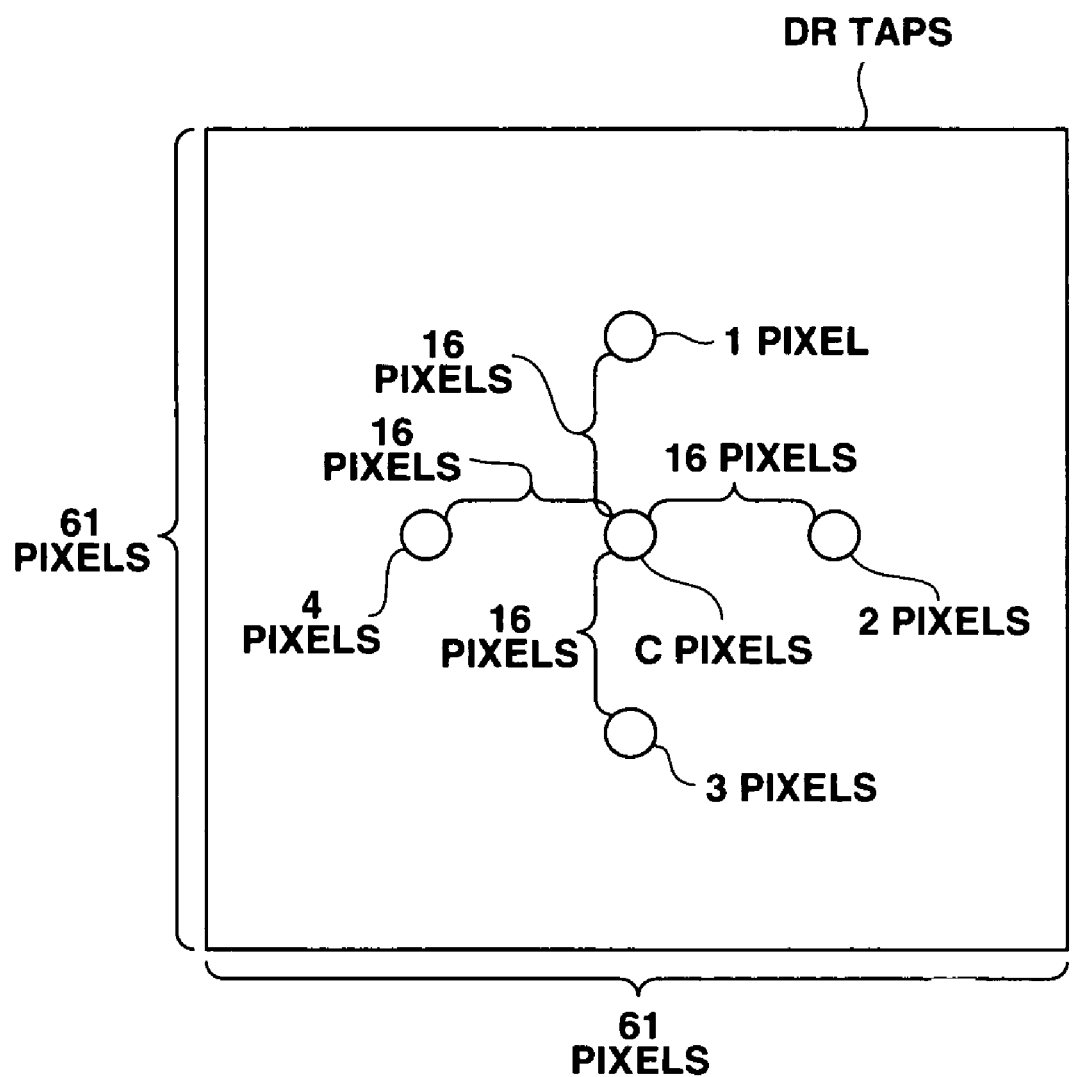
FIG. 20 is a diagram that explains a class tap.

In Step S43, the classifying section 12 acquires the value of the pixel that is contained in the DR tap extracted in Step S32 and corresponds to the class tap illustrated in FIG. 20. More precisely, the section 12 detects four pixels 1 to 4 from the class tap shown in FIG. 20. The pixel 1 is located above the center pixel C of the DR tap, spaced apart therefrom by a 16-pixel distance. The pixel 2 exists on the right of the center pixel C, spaced apart therefrom by a 16-pixel distance. The pixel 3 lies below the center pixel C, spaced apart therefrom by a 16-pixel distance. The pixel 4 exists on the left of the center pixel C, spaced apart therefrom by a 16-pixel distance. Further, the classifying section 12 obtains the values (luminance) of the pixels 1 to 4 extracted in Step S32.

Figure 21:
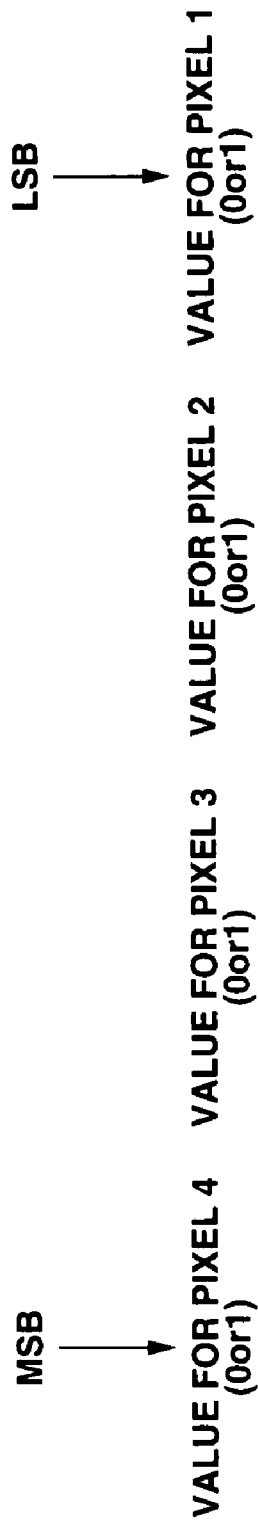
FIG. 21 is a diagram that explains a class number.

In Step S44, the classifying section 12 determines a class number that will be allocated to the DR tap, from the values of pixels 1 to 4 which it has acquired in Step S43. As shown in FIG. 21, the class number is composed of four values for the pixels 1 to 4, the first and second values for the pixels 1 and 4 being LSB and MSB, respectively. The value for a pixel is "1" if the pixel has luminance higher than the threshold value B calculated in Step S42, and is "0" if the pixel has luminance equal to or lower than the threshold value B. Namely, the value for any pixel is one-bit data that is either "0" or "1." The class number is, therefore, four-bit data that ranges from "0000" to "1111." Thus, sixteen data items, "0000" to "1111," are class numbers (0 to 15). In this instance, the first to fourteenth class numbers are allocated to the DR tap.

That is, the classifying section 12 determines in Step S44 whether the pixel value (luminance) acquired in Step S43 is greater than the threshold value B or not. If the pixel value is greater than the value B, the section 12 set the value for the pixel at "1." Otherwise, the section 12 set the value for the pixel at "0." Finally, the section 12 generates one of possible four-bit data items ("0000" to "1111"). The section 12 determines a class number from the four-bit data item generated. In Step S45, the classifying section 12 allocates the class number determined in Step S44 to the DR tap.

As mentioned above, the class number is allocated in accordance with the change (gradient) in the pixel values (luminance) of the class tap. Hence, the same class is allocated to class taps (DR taps) which have undergone the changes (gradients) in the pixel values (luminance).

Once the class number is allocated to the DR tap, the process of allocating class number is terminated. The operation then goes to Step S34 shown in FIG. 18.

In Step S34, the classifying section 12 determines whether the feature region has any part that has not been classified as a predetermined pixel. If YES, the process returns to Step S32, in which a new DR tap is extracted. In this case, Steps S33 and S34 will be repeated.

Figure 22A:
FIG. 22A, FIG. 22B and FIG. 22C are diagrams depicting three feature regions that correspond to the images shown in FIG. 2A, FIG. 2B and FIG. 2C, respectively.
Figure 22A:
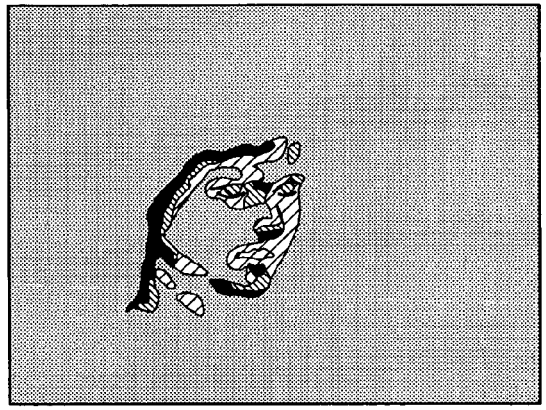
Figure 22B:
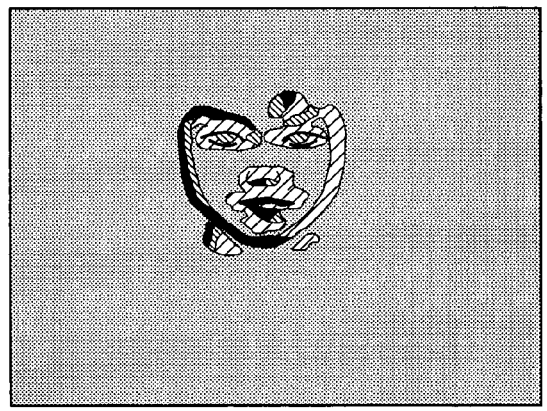
Figure 22C:
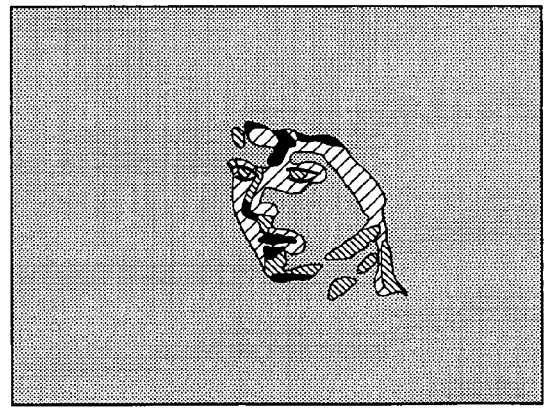

In Step S34 it may be determined that the feature region has no part that has been classified as a predetermined pixel. That is, it may be determined hat a class number has been allocated to all pixels, which are to be extracted from the feature region and that the blocks forming the feature region have been classified. If this is the case, the process goes to Step S35. FIG. 22A, FIG. 22B and FIG. 22C show three feature regions that have been thus classified. The three feature regions are represented by the feature-region classified image data items that are illustrated in FIG. 4A, FIG. 4B and FIG. 4C, respectively. As seen from FIGS. 22A, 22B and 22C, the region A (to which class number A is allocated), the region B (to which class number B is allocated), and the region C (to which class number C is allocated) change as the orientation of the user's face changes. FIG. 22 shows only three feature regions, for the sake of simplicity. Thus, the class, into which the pixels representing the same part of the face have been classified, changes as the user turns his or her face.

In Step S35, the classifying section 12 generates such a histogram T as is shown in FIG. 14. The histogram T is supplied to the operation section 13. Illustrated in the histogram T are groups of DR taps, to which 14 class numbers (the first number "0000" to the fourteenth number "1111") are allocated. The histogram T represents the frequency, i.e., the number of DR taps to which one class number is allocated.

In Step S36, the operation section 13 calculates a value for the correlation between the histogram T generated in Step S35 and the histograms $R_1$, $R_2$ and $R_3$ stored in the storage section 14, in accordance with the following normalization equation. More specifically, the section 13 finds three correlation values $W_1$, $W_2$ and $W_3$ by using the following equation (2):

$$W = \frac{\sum_i (N_i - \text{means value} N) \times (T_i - \text{means value} T)}{\sqrt{\sum_i (N_i - \text{means value} N)^2 \times \sum_i (T_i - \text{means value} T)^2}} \quad (2)$$

In the equation (2), i (=1, 2, 3, c 14) is a class number, $T_i$ is the frequency of the ith class number of the histogram T generated in Step S35, and the mean value T has been obtained by dividing the number of pixels forming the feature region by the class number. Note that the mean value T is the average frequency of the histogram T is allocated. Also in the equation (2), $N_i$ is the frequency of the ith class number of the histogram R, and N is the average frequency of the histogram R. Note that the histogram R is stored in the storage section 14, and its correlation value with respect to the histogram T will be calculated.

Figure 23:
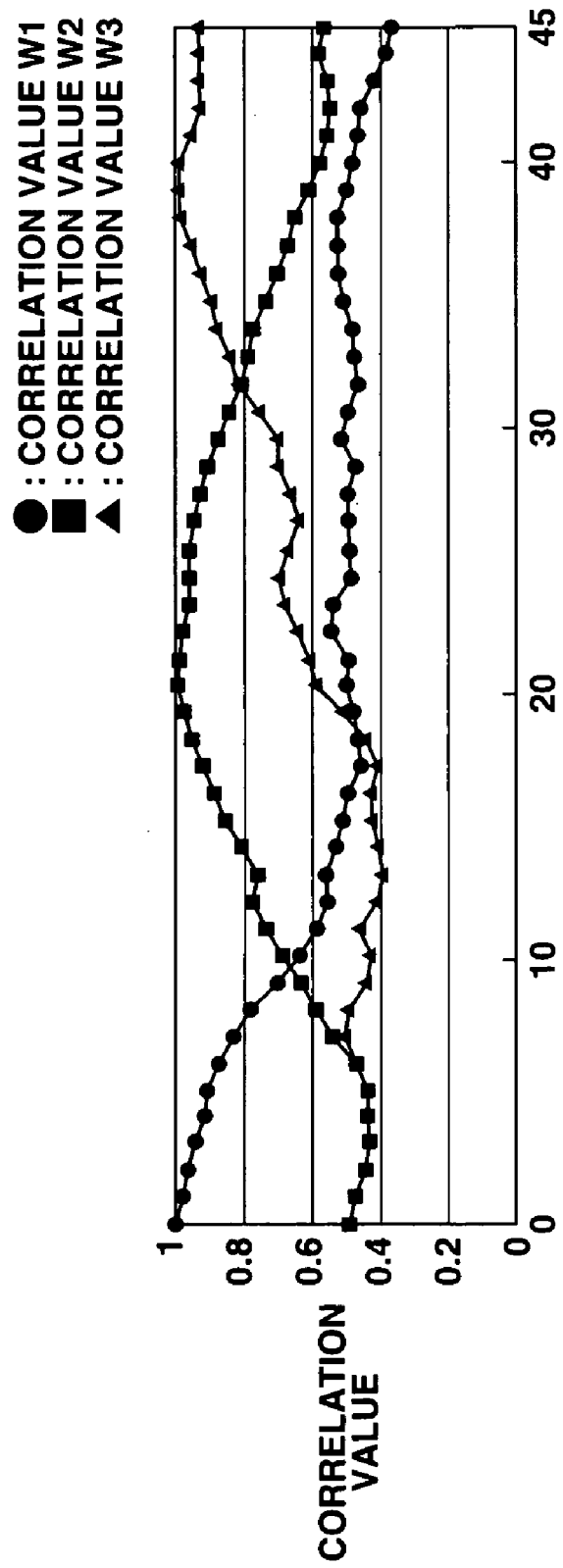
FIG. 23 is a graph representing correlation values $W_1$, $W_2$, and $W_3$.

In Step S37, the operation section 13 detects the orientation (angle) of the user's face from the three correlation values $W_1$, $W_2$ and $W_3$ calculated in Step S36. For example, the section 13 compares the histogram T generated from the image data representing the user's face turned to a prescribed direction, with the correlation values $W_1$, $W_2$ and $W_3$ of the histograms $R_1$, $R_2$ and $R_3$ calculated in Step S36, as is illustrated in FIG. 23. The orientation (angle) of the user's face can be thereby detected. To compare the histogram T with the correlation values $W_1$, $W_2$ and $W_3$, there is selected such an angle that a minimum value may be calculated by equation of $Ó|W_i - W_i'|$ from the correlation value $W_i$ with respect to the histogram $R_i$ and the correlation value $W_i'$ obtained in Step S36. FIG. 23 shows the correlation values $W_1$, $W_2$ and $W_3$ plotted for 45 image data items generated by photographing the user's face at regular intervals, as the face turns from a state orientated by about 90° to the right to a state orientated by about 90° to the left, with respect to the front position.

The orientation (angle) of the user's face is thus detected. The histogram T generated remains unchanged, even if the position of the image of the face (i.e., the position or angle of the image in the frame) changes, or even if the angle of the image of the face changes (for example, if the image turns upside down), so long as the orientation of the user's face remains unchanged. That is, although the frequency of each region changes, the histogram T generated presents the same distribution of frequency, regardless of the size of the image photographed, if the orientation of the user's face remains unchanged. Thus, in this case, too, the correlation value calculated in accordance with the normalization equation remains unchanged, and so does the orientation (angle) of the user's face. In other words, the orientation can be easily detected, without examining a search area as in the template mapping method.

In the present embodiment, the DR tap and the class tap have different patterns. Nonetheless, they may be of the same pattern in the present invention.

It will be described how the learning process is performed, generating the relation information that is stored in the storage section 14.

The relation information is generated from the orientation (angle) data showing the orientation of the user's face and the image data representing the user's face. The orientation data and the image data can be efficiently acquired if a plurality of image processing apparatuses identical to the apparatus 1 are arranged, in predetermined positional relations (angels) with respect to the user.

Figure 24:
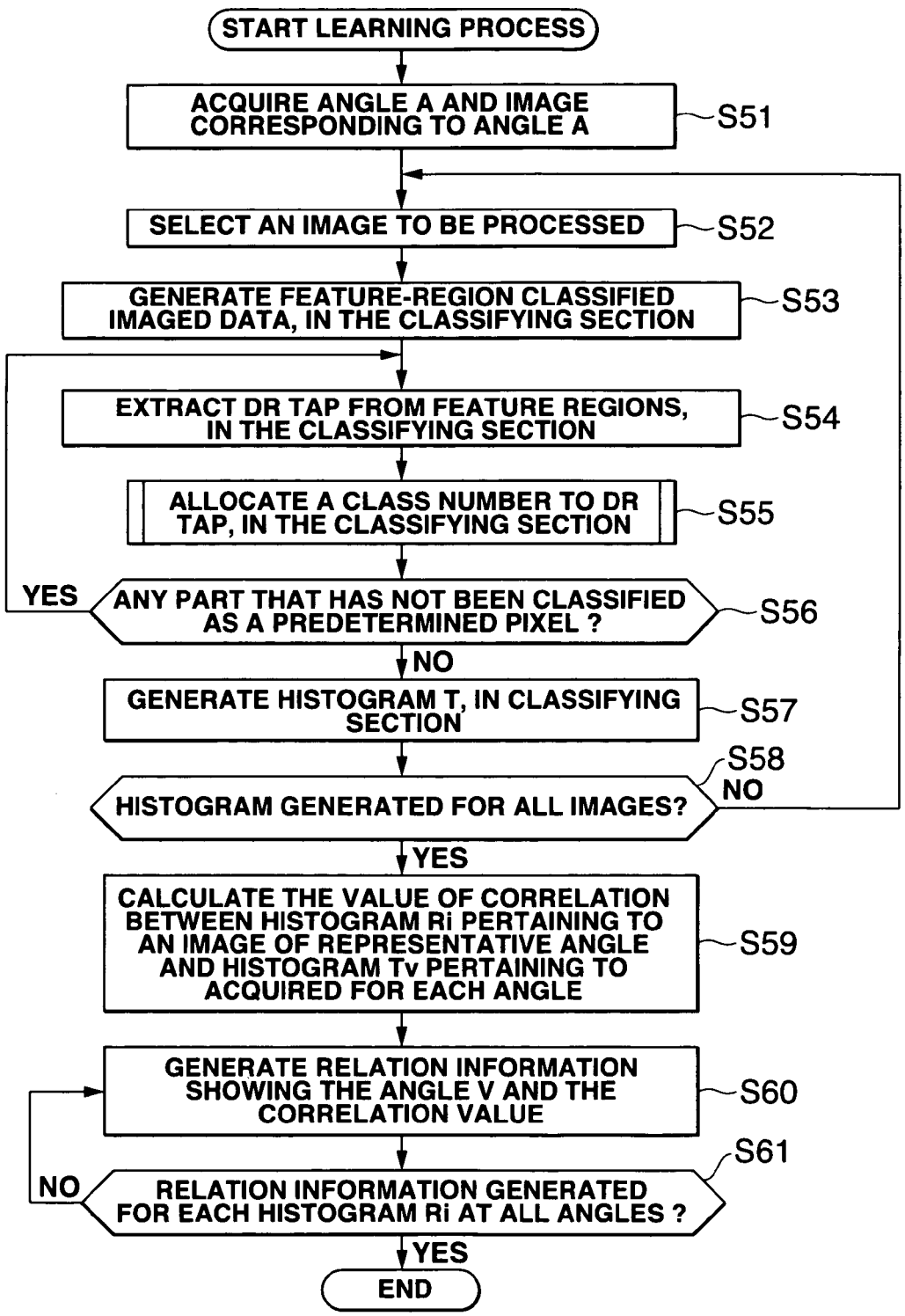
FIG. 24 is a flowchart explaining the sequence of the learning process for generating relation information in the second embodiment of the invention.

The relation information is generated by performing the learning process as will be explained below, with reference to the flowchart of FIG. 24.

In the learning process for generating the relation information, a plurality of images corresponding to each angle A are acquired, along with the angle A, in Step S51.

In the next step, i.e., Step S52, an image is selected to be processed.

Steps S53 to S57, which are identical to Steps S31 to S35 shown in FIG. 18, are performed, thereby generating a histogram T.

In Step S59, it is determined whether the histogram is complete for all images. If any image has not been processed, the process returns to Step S51 and Steps S51 to S58 will be carried out again. If the histogram is complete for all images, the process goes to the next step, i.e., Step S59.

In Step S59, a correlation value $W_{ij}$ is calculated, which represents the correlation between a histogram $R_i$ and a histogram $T_j$. The histogram $R_i$ pertains to an image of a representative angle, whereas the histogram $T_j$ pertains to one image orientated by an angle.

In Step S60, relation information representing the relation between the angle V and the correlation value is generated for each histogram $R_i$.

In Step S61, it is determined whether relation information has been generated for each histogram $R_i$ at all angles V. If NO, the process returns to Step S60, which is repeated. If YES, the learning process is terminated.

Namely, the learning process is terminated after a weight coefficient $W_i$ has been thus set.

In an image processing apparatus 1 according to the third embodiment of the invention, the classifying section 12, operation section 13 and storage section 14 may cooperate to carry out the following process.

In the third embodiment, the classifying section 12 generates feature-region classified image data from the pre-classification image data output from the photographing section 11, in the same way as in the image processing apparatus according to the first embodiment. [only three feature regions, for the sake of simplicity.]

The classifying section 12 then performs class-number allocation on the feature-region classified image data, thereby classifying feature regions of the feature-region classified image data, into a plurality of classes. In this embodiment, the section 12 classifies the feature regions into 16 classes, i.e., the 0th class to the fifteenth class. However, FIG. 22 shows the feature-region classified image data, in which the feature region has been divided into only three feature regions A to C, for the sake of simplicity.

Further, the classifying section 12 generates a histogram T from the classes of the feature regions. Like the histogram shown in FIG. 14, the histogram T represents the frequency, or the number of regions (DR taps) of each of the sixteen classes (i.e., the 0th class to the fifteenth class, in this case). The classifying section 12 supplies the feature-region classified image data, histogram T and pre-classification image data to the operation section 13.

Figure 25:
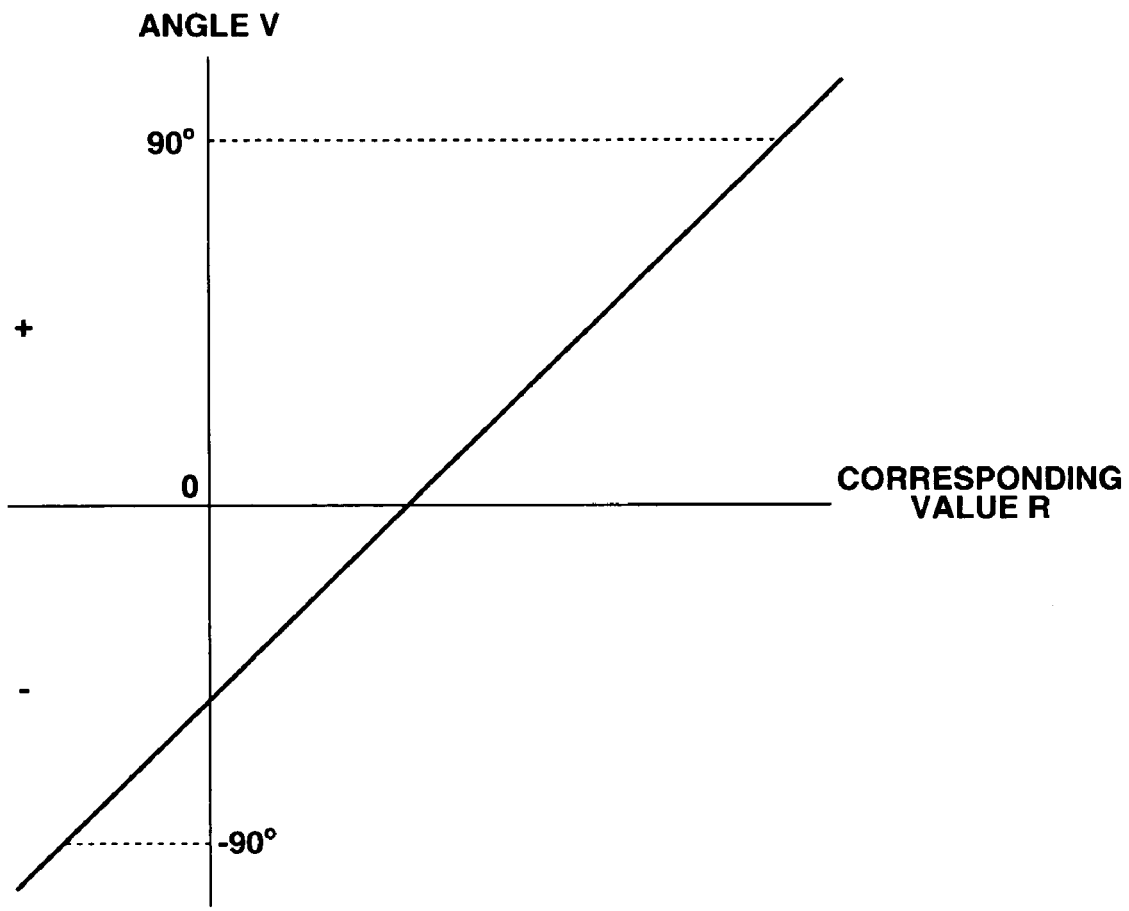
FIG. 25 is a graph representing the relation information generated in the third embodiment of the invention.

The operation section 13 calculates the value of relation with respect to the orientation of the face, from the feature-region classified image data, histogram T and pre-classification image data supplied from the classifying section 12. The section 13 also detects the orientation of the user's face (or the angle to the front position) from such relation information as is illustrated in FIG. 25. How the relation information has been generated will be described later.

The process of detecting the angle is carried out in the third embodiment, as will be explained below with reference to the flow chart of FIG. 26.

When the classifying section 12 receives the image data from the imaging section 11, it performs Steps S71 to S75 that are identical to Steps S31 to S35 (FIG. 18) carried out in the second embodiment. The section 12 therefore generates a histogram T of the type illustrated in FIG. 14. Illustrated in the histogram T are groups of DR taps, to which 14 class numbers (the first number "0000" to the fourteenth number "1111") are allocated. The histogram T represents the number of DR taps (frequency) to which one class number is allocated. In this embodiment, the 0th frequency and the fifteenth frequency are not used to calculate a correlation value in Step S77 that will be described later.

In Step S76, the classifying section 12 supplies the pre-classification image data, the feature-region classified image data generated in Step S74 and the histogram T generated in Step S75, to the operation section 13.

In Step S77, the operation section 12 calculates the value $X_1$ for the gravity center of the face image, which exists on the X-axis (see FIG. 2), and finds the angle V in accordance with the following equation (3):

$$angle V = \sum_{i}^{class\ number} W_i \times C_i \times D_i \quad (3)$$

In the equation (3), value $D_i$ (i=1, 2, 3, ... 15) is the difference between the value $X_1$ for the gravity center of the face image and the value $X_{2i}$ for the gravity center of the region to which the ith class number is allocated. $C_i$ is the frequency that corresponds to the ith class number in the histogram T. $W_i$ is a weight coefficient preset for one class number.

The weight coefficient $W_i$ will be described in more detail. The weight coefficient $W_i$ is a value that is determined from the correlation between difference $D_2$, $C_i \times D_i$ and angle V. The difference $D_2$ is the difference between the value $X_{2i}$ of the region to which the class number has been allocated and the value $X_i$ of the image of the face. (Note that the angle V is the orientation of the face, which has been acquired by performing the learning process that will be described later.) The weight coefficient has a great value (for example, 1) if the correlation is intense, and has a small value (for example, 0) if the correlation is weak.

Figure 27A:
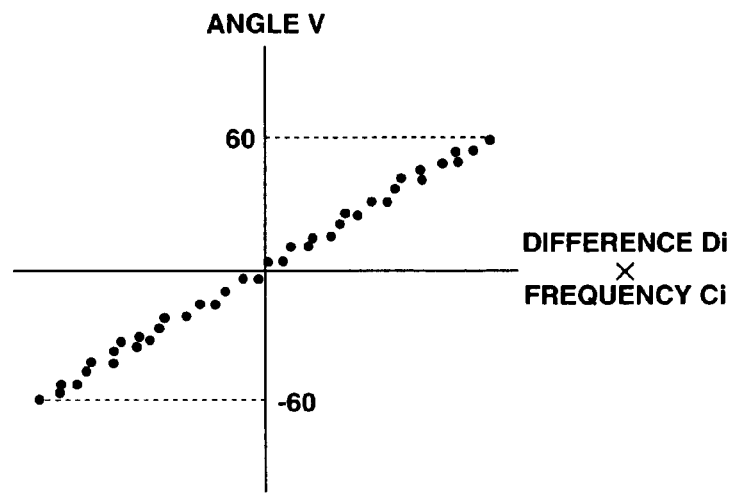
FIG. 27A and FIG. 27B are graphs, each showing the degree of correlation between the difference D and the angle V.
Figure 27B:
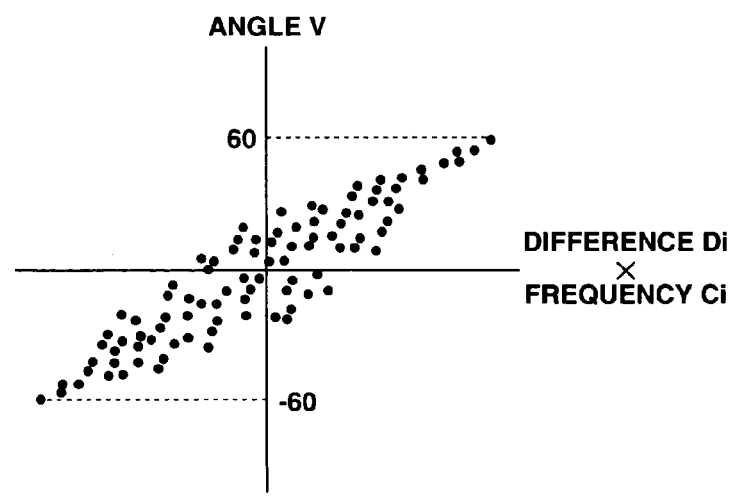

Consider the distribution of points, which is determined by difference D, frequency C, and angle V. D is the difference between the value $X_2$ and the value $X_1$. The value $X_2$ pertains to the gravity center of a region (e.g., region A shown in FIG. 22) that changes as the orientation of the face changes. The value $X_1$ pertains to the gravity center of the face. The distribution of points, which is determined by (difference D×frequency C) and angle V, may be represented by a straight line as is illustrated in FIG. 27A. In this case, the value (difference D×frequency C) and the angle V are correlated firmly, and the class that is allocated to the region has a large weight coefficient. On the other hand, if the distribution of points, which is determined by (difference D×frequency C) and angle V, diverges is illustrated in FIG. 27B, the value (difference D×frequency C) and the angle V are correlated but a little. In this case, the class that is allocated to the region has a small weight coefficient.

FIG. 27A and FIG. 27B each show the distribution of points, which has been determined from difference D and an angle. Note that the difference D having been calculated from the image data acquired by photographing the user's face at regular intervals, as the face turns from a state orientated by about 60° to the right (i.e., +60° position) to a state orientated by about 60° to the left (i.e., −60° position), with respect to the front position. The angle is the orientation of the face, which has been acquired by a learning process.

Once the orientation (angle) of the user's face is detected, the process is terminated.

As indicated above, the angle V is calculated in accordance with the equation (3). Instead, the angle V may be calculated in accordance with the following equation (4):

$$angleV = \sum_{i}^{class\ number} (W_{i1}, W_{i2}, W_{i3}, W_{i4}, W_{i5}, W_{i6}, W_{i7}) \times \quad (4)$$
$$(C_i \times D_i, 1/(C_i \times D_i), D_i, C_i, 1/D_i, 1/C_i, 1)$$

The DR tap and the class tap have different patterns in the third embodiment. Nevertheless, they may be of the same pattern in the present invention.

As mentioned above, the value X that the gravity center has in the X-axis direction is applied, in order to detect the orientation of the face. Rather, the value Y that the gravity center has in the Y-axis direction may be applied, to detect the orientation of the face.

As described already, the orientation of the face is detected from the positional relation between the gravity center of the face image and the gravity center of the region to which the class number is allocated. The orientation of the face can be therefore detected correctly, regardless of the position of the face. In addition, the angle of the face can be accurately detected. This is because the correlation value is calculated by applying a large weight coefficient W to any region prominently related with the orientation of the face and a small weight coefficient W to any region weakly related with the orientation of the face.

Moreover, the histogram T remains unchanged, even if the position of the image of the face changes (due to, for example, horizontal motion of the face) or if the image of the face is rotated (for example, if the image is turned upside down), provided that the orientation of the user's face remains unchanged. Thus, the orientation (angle) can be easily detected, without examining a search area as in the template mapping method.

The relation information to be stored in the storage section 14 of the apparatus 1 according to the third embodiment is generated by performing the learning process as will be explained below.

The learning process for generating the relation information is effected based on the data representing the orientation (angle) of the user's face and the image data representing the user's face. To acquire the orientation data at high efficiency, a plurality of image processing apparatuses identical to the apparatus 1 are arranged, which have prescribed positional relations (angels) with respect to the user.

Figure 28:
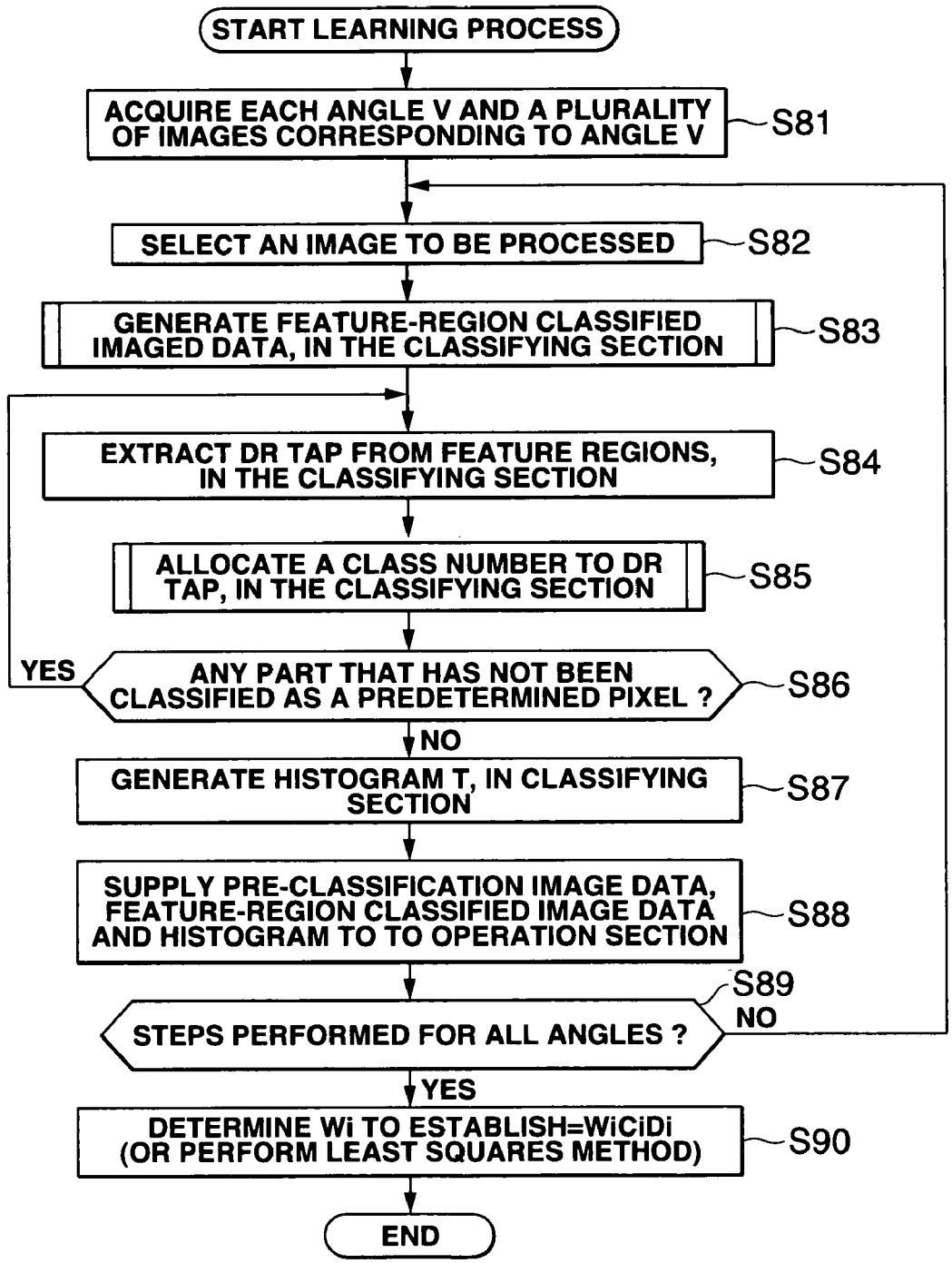
FIG. 28 is a flowchart explaining the learning process that is performed to generate relation information items in the second embodiment of the invention.

The learning process is carried out to generate the relation information, as will be described with reference to the flowchart of FIG. 28.

In the learning process for generating the relation information, a plurality of images corresponding to each angle A are acquired, along with the angle A, in Step S81.

In the next step, i.e., Step S82, an image is selected so that it may be processed.

Figure 26:
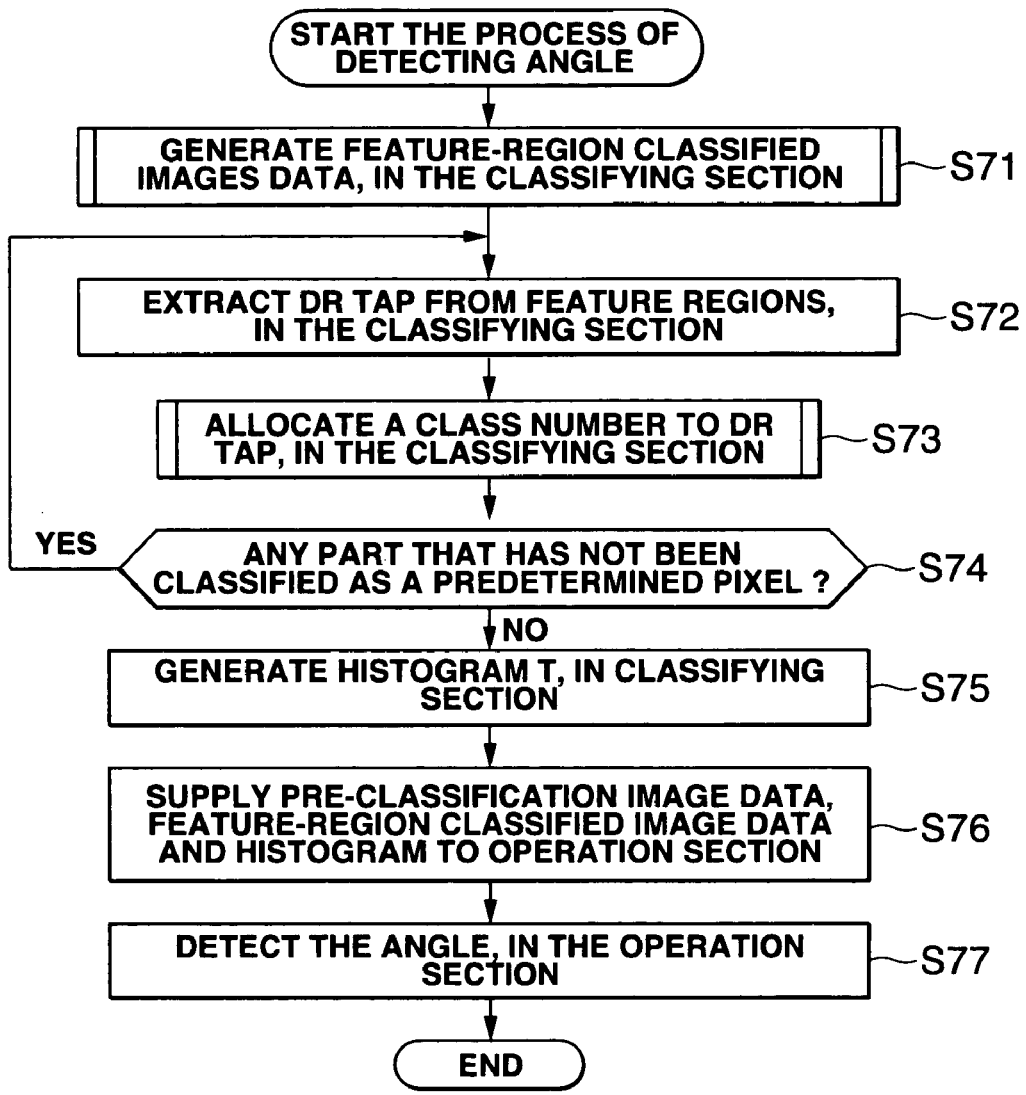
FIG. 26 is a flowchart explaining the process of detecting angles in the third embodiments of the invention.

Steps S83 to S88, which are identical to Steps S71 to S76 shown in FIG. 26, are performed.

In Step S89, it is determined whether the histogram is complete for all images. If any image has not been processed, the process returns to Step S81 and Steps S81 to S89 will be carried out again. If the histogram is complete for all images, the process goes to the next step, i.e., Step S90.

In Step S90, each weight coefficient $W_i$ is set to establish the following equation (5):

$$angleV = \sum_{i}^{class\ number} W_i \times C_i \times D_i \quad (5)$$

In the equation (5), $D_i$ is a value correlated with the gravity center of the image, $C_i$ is a frequency corresponding to the ith class number. In the learning process, the correct angle V and the correct feature amount $(C_i \times D_i)$ can be obtained at the same time. Hence, the correlation between the angle V and the feature amount $(C_i \times D_i)$ can be calculated. The correlation thus calculated is applied as a key signal, thereby determining the weight coefficient $W_i$ from a preset correlation value and a table of weight coefficients. Alternatively, the weight coefficient $W_i$ may be determined by least squares method.

Figure 29:
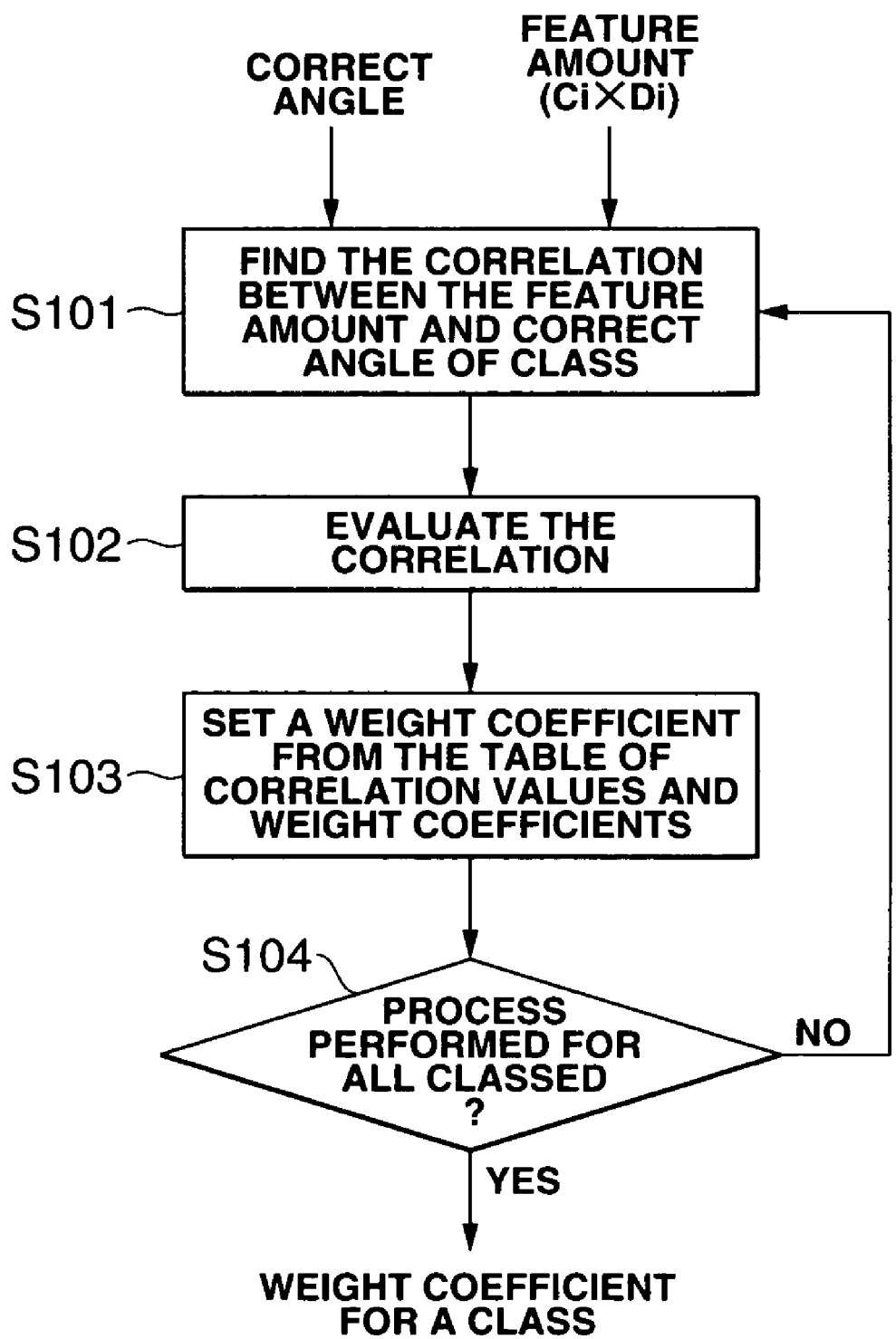
FIG. 29 is a flowchart explaining a method of determining a weight coefficient by using the correlation method.

In the correlation method, the weight coefficient $W_i$ is determined in such a sequence as is illustrated in the flowchart of FIG. 29.

First, the value of the correlation between the angle V and feature amount $(C_i \times D_i)$ of class I is calculated in Step S101.

In Step S102, the correlation value calculated in Step S101 is evaluated.

In Step S103, the weight coefficient $W_i$ is set in accordance with the table of correlation values and weight coefficients.

In Step S104, it is determined whether the process has been performed for all classes. If there is any class not processed, the process returns to Step S101 and Steps S101 to S104 are repeated to set a weight coefficient $W_i$ for each class.

Figure 30:
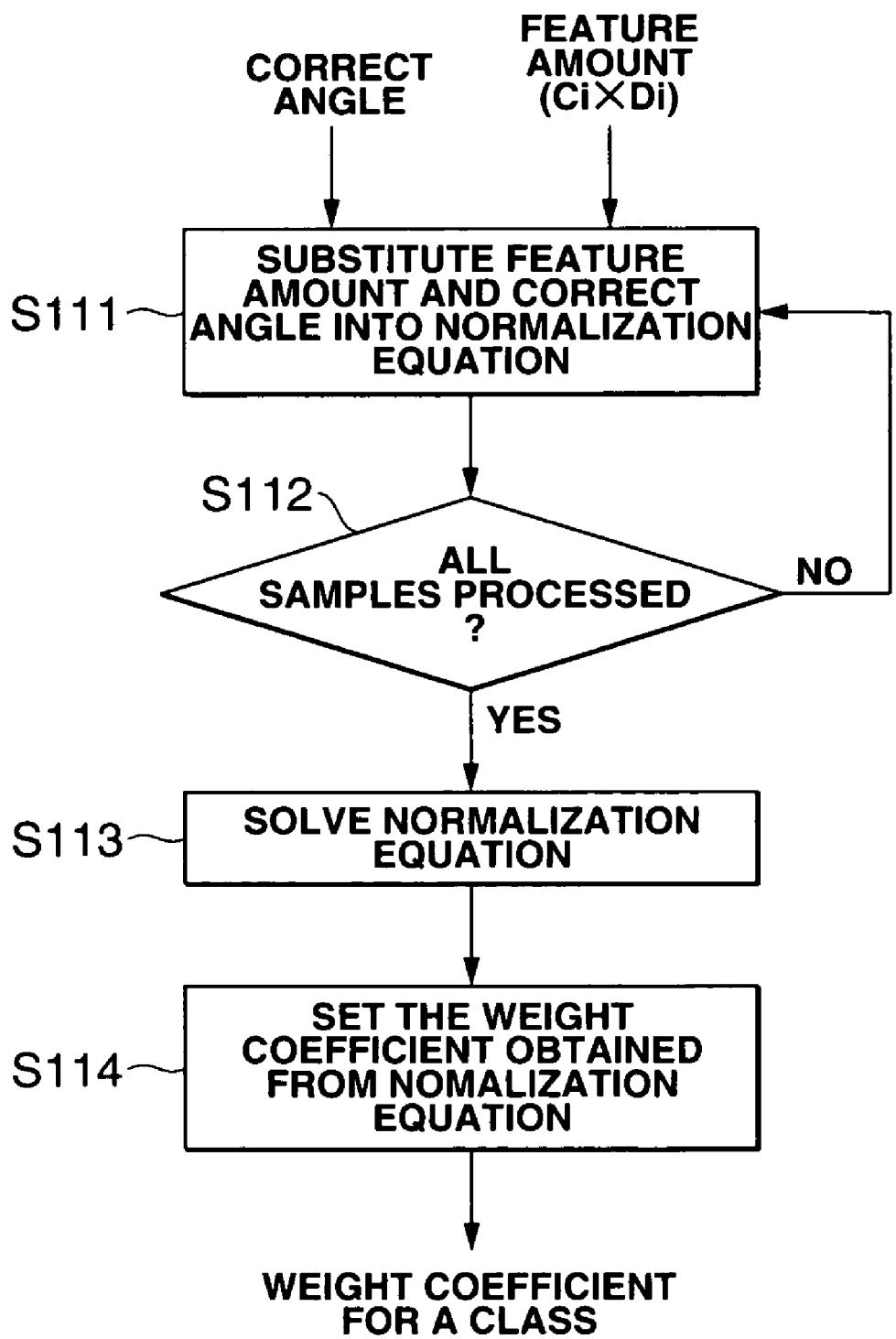
FIG. 30 is a flowchart explaining a method of determining a weight coefficient.

The weight coefficient $W_i$ may be determined by the least squares method, as will be explained with reference to the flowchart of FIG. 30.

More precisely, the angle V and the feature amount $(C_i \times D_i)$ are substituted into a normalization equation in Step S111.

In Step S112, it is determined whether Step S111 has been performed on all samples. If there is any sample that has not been processed, the process returns to Step S111, and Steps S111 and S112 are repeated. If Step S111 has been effected on all samples, the process goes to Step S113.

In Step S113, the normalization equation, now containing the angle V and the feature amount $(C_i \times D_i)$, is solved by means of, for example, the Kholesky decomposition method, thereby obtaining a weight coefficient.

Finally, the weight coefficient obtained in Step S113 is set in Step S114.

In all embodiments described above, each feature region is extracted from a plurality of pixels. Nonetheless, each feature region may be extracted from one pixel. This holds true of the classification of feature regions.

In each embodiment described above, the sequence of steps can be carried out by either hardware or software. In the case where software performs the sequence, the programs constituting the software are installed in the computer that is incorporated in the image processing apparatus 1 (hardware), or in the general-purpose computer that is connected to the image processing apparatus 1.

The programs describing the sequence of steps may be recorded on a recording medium, which may be installed into a computer. Such a recording medium will be described with reference to FIG. 31, on the assumption that the computer is a general-purpose computer.

Figure 31A:
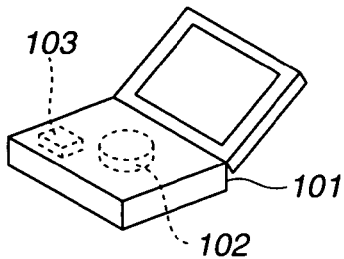
FIGS. 31A, 31B and 31C are diagrams for explaining the recording medium according to the invention.
Figure 31B:
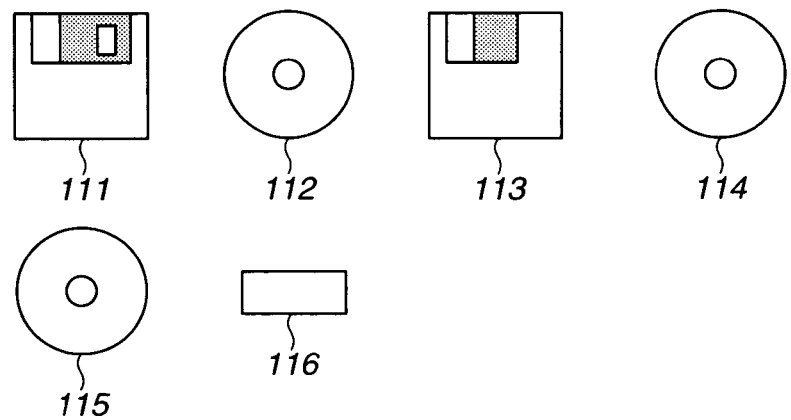
Figure 31C:
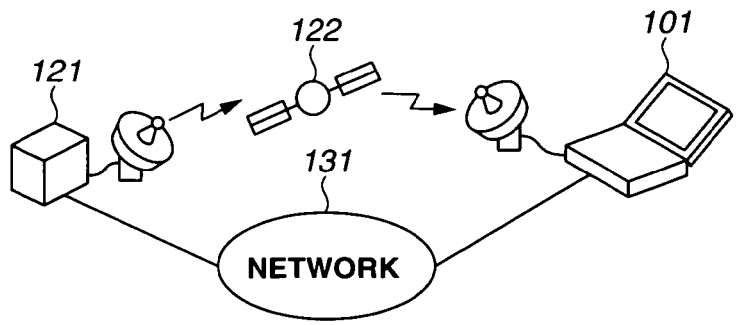

The programs may be supplied to users in the form of the hard disc 102 or semiconductor memory 103 already provided in a computer 101, as is illustrated in FIG. 31A.

Alternatively, the programs may be supplied in the form of a recording medium such as a floppy disc 111, a CD-ROM (Compact Disc-Read Only Memory) 112, an MO (Magneto-Optical) disc 113, a DVD (Digital Versatile Disc) 114, a magnetic disc 115 or a semiconductor memory 116. The programs may be recorded in the recording medium, either temporarily or permanently. In other words, the programs may be supplied in the form of package software.

Moreover, the programs may be transmitted from the down-loading site 121 to the computer 101 via a digital-broadcast satellite 122. Alternatively, they may be transmitted from the site 121 to the computer 101 through a network 131 such as a local-area network or the Internet. In the computer 101, the programs can be recorded on the hard disc 102.

The term "recording medium" used in the present specification has a broad sense, meaning all of these recording media.

Figure 32:
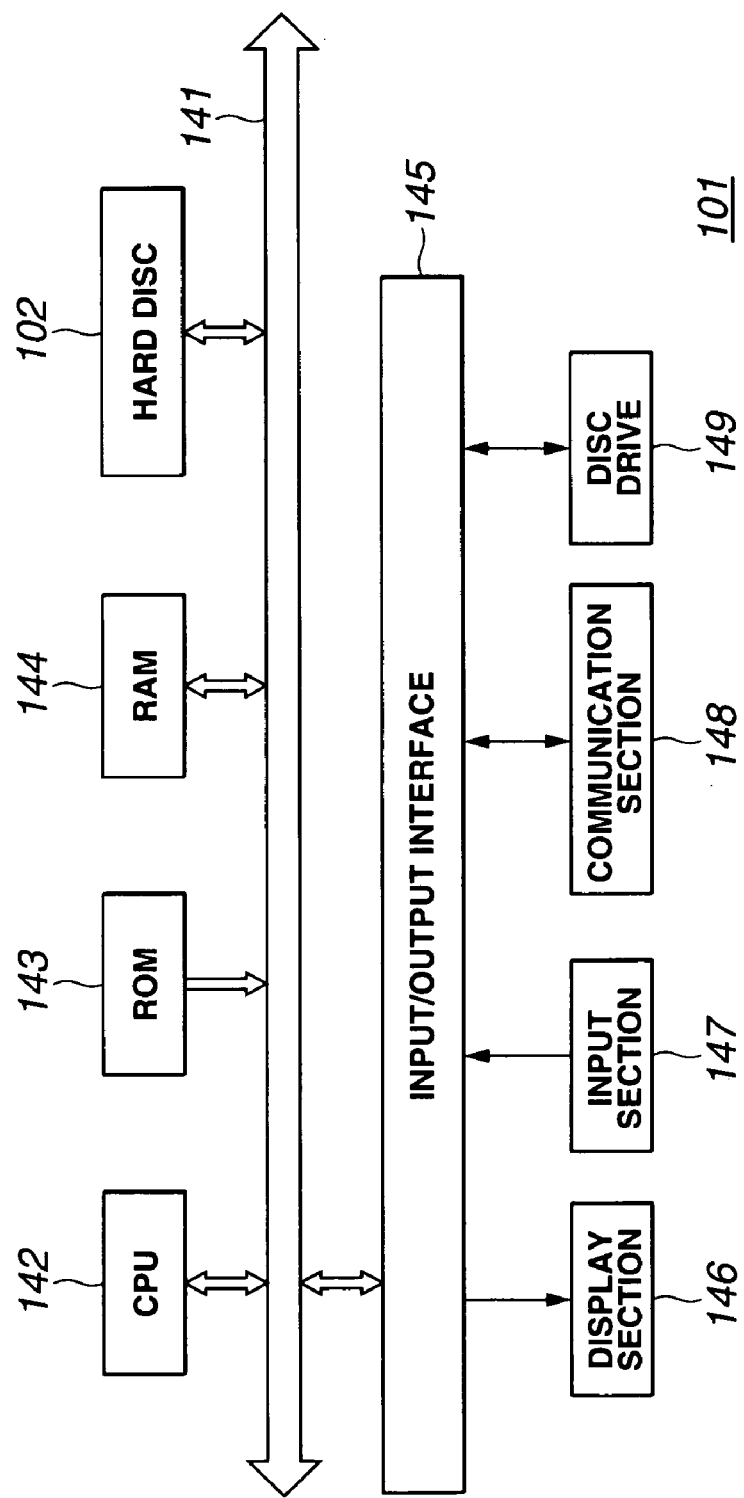
FIG. 32 is a diagram illustrating the structure of a computer.

The computer 101 incorporates, for example, a CPU (Central Processing Unit) 142 as is illustrated in FIG. 32. A bus 141 connects the CPU 142 to an input/output interface 145. The CPU 142 receives instructions from the input section 147 of the user, such as a keyboard or a mouse, through the input/output interface 145. In accordance with the instructions, the CPU 142 executes the programs stored in the ROM (Read Only Memory) 143 that is equivalent to the semiconductor memory 103 shown in FIG. 31A. Alternatively, the CPU 142 may read the programs installed in the hard disc 102, the programs transmitted from the satellite 122 or through the network 131, received by the communication section 148 and installed into the hard disc 102, the programs stored in the floppy disc 111, CD-ROM 112, MO disc 113, DVD 114 or magnetic disc 115, which is mounted in a disc drive 149, or the programs installed in the hard disc 102. The CPU 142 may then load the programs into a RAM (Random Access Memory) 144 and execute the programs. Further, the CPU 142 outputs, if necessary, the data it has processed, to a display section 146 such as an LCD (Liquid Crystal Display) through the input/output interface 145.

The programs provided in the form of a recording medium may be descried in a prescribed time sequence or not in time sequence, that is, in parallel altogether, or independently of one another.

The word "system" as used in the present specification means an apparatus that comprises a plurality of devices.

What is claimed is:

1. An image processing apparatus comprising:
   extracting means for extracting a feature region from a region of an object in an image, in accordance with a luminance distribution of a plurality of pixels adjacent to a predetermined pixel,
      wherein the extracting means includes feature region extracting means for extracting the predetermined pixel as a pixel existing in the feature region, when a dynamic range is greater than a predetermined value;
   calculating means for calculating a gravity-center correlation value that shows the correlation between the gravity center of the feature region and the gravity center of the image region of the object; and
   determining means for determining an orientation of the object from the gravity-center correlation value.

2. The image processing apparatus according to claim 1, wherein the extracting means includes:
   pixel extracting means for extracting a plurality of pixels for detecting the dynamic range from the image region, in accordance with the position of the pixel of the predetermined pixel existing in the image region of the object; and
   dynamic range calculating means for calculating the dynamic range of the pixels.

3. The image processing apparatus according to claim 1, wherein the determining means determines the orientation of the object, in accordance with the relation information that shows a relation between the gravity-center correlation value and the orientation of the object.

4. The image processing apparatus according to claim 1, wherein the calculating means calculates the gravity-center correlation value in accordance with the difference between a position of the gravity center of the feature region and the position of the gravity center of the image region of the object.

5. An image processing apparatus comprising:
   extracting means for extracting a feature region from an image region of an object, in accordance with a luminance distribution of pixels adjacent to a predetermined pixel;
   classifying means for classifying each pixel existing in the feature region into one of a plurality of classes;
   distribution table generating means for generating an objective frequency distribution table which shows a frequency distribution of pixels in each class; and
   determining means for determining an orientation of the object in accordance with the objective frequency distribution table.

6. The image processing apparatus according to claim 5, wherein the extracting means includes:
   pixel extracting means for extracting a plurality of pixels for detecting a dynamic range from the image region of the object, in accordance with the position of the predetermined pixel existing in the image region of the object;
   dynamic range calculating means for calculating the dynamic range of the extracted pixels; and
   feature region extracting means for extracting the predetermined pixel existing in the feature region, when the dynamic range is greater than a predetermined value.

7. The image processing apparatus according to claim 5, wherein the determining means includes:
   gravity-center calculating means for calculating the gravity center of a region of pixels which are classified by the classifying means, in each class;
   object gravity-center calculating means for calculating a gravity-center value of the image region of the object;
   gravity-center correlation calculating means for calculating a gravity-center correlation value in each class, which value shows correlation between the gravity center of the feature region and the image region of the object; and
   orientation determining means for determining an orientation of the object, in accordance with the gravity-center correlation value in each class and the objective frequency distribution table.

8. The image processing apparatus according to claim 7, wherein the orientation determining means calculates the gravity-center correlation value and a frequency of the objective distribution table in each class and preset weight coefficients, and detects the orientation of the object by adding the results of calculating.

9. The image processing apparatus according to claim 8, wherein the operation is performed in accordance with the following equation:

$$\text{angle} = \sum_{i}^{\text{class number}} (\text{weight coefficient})_i \times (\text{gravity} - \text{centercorrelation value})_i \times (\text{frequency})_i$$

10. The image processing apparatus according to claim 8, wherein the operation is performed in accordance with the following equation:

$$\text{angleV} = \sum_{i}^{\text{class number}} (W_{i1}, W_{i2}, W_{i3}, W_{i4}, W_{i5}, W_{i6}, W_{i7}) \times (C_i \times D_i, 1/(C_i \times D_i), D_i, C_i 1/D_i, 1/C_i, 1)$$

where wij is the weight coefficient for each class i (j is an integer), Ci is the gravity-center correlation value, Di is the frequency.

11. The image processing apparatus according to claim 5, wherein the determining means includes:
storage means for storing a reference frequency distribution table which shows a frequency of pixels in the feature region on each class in a representative orientation;
frequency-distribution correlation value generating means for generating a frequency distribution correlation value which shows a correlation between the objective frequency distribution table and the reference frequency distribution table; and
orientation determining means for determining an orientation of the object in accordance with the frequency distribution correlation value.

12. The image processing apparatus according to claim 11, wherein the orientation determining means includes:
data storage means for storing orientation information which shows a relation between the orientation of the object and the frequency distribution correlation value; and
correlation-utilized orientation-determining means for determining the orientation of the object in accordance with the frequency distribution correlation value, by referring to the orientation information.

13. The image processing apparatus according to claim 5, wherein the determination means includes:
storage means for storing a frequency distribution table which shows a frequency of pixels in the feature region in each class in each of a plurality of representative orientation;
frequency-distribution correlation value generating means for generating frequency distribution correlation values which show the correlations between each objective frequency distribution table and the reference frequency distribution table; and
orientation determining means for determining an orientation of the object in accordance with the frequency distribution correlation values.

14. The image processing apparatus according to claim 13, wherein the orientation determining means includes:
data storage means for storing orientation information which shows relation between the orientation of the object and each of the frequency distribution correlation value of each representative orientation; and
correlation-utilizing orientation-determining means for determining the orientation of the object in accordance with the frequency distribution correlation values, by referring to the orientation information for determining an orientation.

15. The image processing apparatus according to claim 13, wherein the orientation determining means includes:
data storage means for storing orientation information which shows relation between the orientations of the object and the frequency distribution correlation values; and
correlation-utilizing orientation-determining means for determining the orientation of the object in accordance with the frequency distribution correlation values, by referring to the orientation information for determining an orientation.

16. An image processing apparatus comprising:
determining means for determining an orientation of an object;
extracting means for extracting a feature region from a region of an object in each image which corresponds to an orientation of the object, in accordance with a luminance distribution of a plurality of pixels adjacent to a predetermined pixel existing in each image,
wherein the extracting means includes feature region extracting means for extracting the predetermined pixel as a pixel existing in the feature region, when a dynamic range is greater than a predetermined value;
calculating means for calculating a gravity-center correlation value that shows the correlation between the gravity center of the feature region and the gravity center of the region of the object in each image; and
generating means for generating relation information which shows the relation between the gravity-center correlation value and an orientation of the object.

17. The image processing apparatus according to claim 16, wherein the extracting means includes:
pixel extracting means for extracting a plurality of pixels for detecting the dynamic range from the image region, in accordance with the position of the pixel of the predetermined pixel existing in the image region of the object; and
dynamic range calculating means for calculating the dynamic range of the pixels.

18. The image processing apparatus according to claim 16, wherein the calculating means calculates the gravity-center correlation value in accordance with the difference between a position of the gravity center of the feature region and the position of the gravity center of the image region of the object.

19. An image processing apparatus comprising:
determining means for determining an orientation of an object;
extracting means for extracting a feature region from a image region of the object in each image which corresponds to an orientation of the object, in accordance with a luminance distribution of a plurality of pixels corresponding to an predetermined pixel existing in each image;
classifying means for classifying each pixel existing in the feature region, into one of a plurality of classes;
distribution generating means for generating a reference frequency distribution table which is a frequency distribution of a number of pixels, which are classified in the classifying means, in each class;

gravity-center calculating means for calculating a gravity center of an image region consisting of pixels in each class, which pixels are classified in the classifying means;

object gravity-center calculating means for calculating a gravity center of the image region of the object;

gravity-center correlation calculating means for calculating a gravity-center correlation value that shows correlation between the gravity center of the feature region and the gravity center of the region of the object in each class; and relation information calculating means for calculating relation information values in accordance with the gravity-center correlation information value of each class, the reference frequency distribution table and the orientation of the object.

20. The image processing apparatus according to claim 19, wherein the extracting means includes:

pixel extracting means for extracting a plurality of pixels for detecting a dynamic range from the image region, in accordance with the position of the pixel of the predetermined pixel existing in the image region of the object;

dynamic range calculating means for calculating the dynamic range of the pixels; and feature region extracting means for extracting the predetermined pixel as a pixel existing in the feature region, when the dynamic range is greater than a predetermined value.

21. The image processing apparatus according to claim 19, wherein the operation is performed in accordance with the following equation:

$$\text{angle} = \sum_{i}^{\text{class number}} (\text{weight coefficient})_i \times (\text{gravity-centercorrelation value})_i \times (\text{frequency})_i$$

22. The image processing apparatus according to claim 19, wherein the operation is performed in accordance with the following equation:

$$\text{angleV} = \sum_{i}^{\text{class number}} (W_{i1}, W_{i2}, W_{i3}, W_{i4}, W_{i5}, W_{i6}, W_{i7}) \times (C_i \times D_i, 1/(C_i \times D_i), D_i, C_i1/D_i, 1/C_i, 1)$$

where wij is the weight coefficient for each class i (j is an integer), Ci is the gravity-center correlation value, Di is the frequency.

23. An image processing apparatus comprising:

acquiring means for acquiring images of an orientation of an object, in association with information about an orientation of the object;

extracting means for extracting a feature region from the image region of the object, for the orientation data, in accordance with a luminance distribution of a plurality of pixels corresponding to a predetermined pixel;

classifying means for classifying each pixel existing in the feature region into one of a plurality of classes;

distribution table generating means for generating a frequency distribution table of a number of pixels, which pixels are classified in the classifying means, in each class;

correlation generating means for generating a frequency-distribution correlation value that shows correlation between one distribution table called a reference histogram and at least one of the other distribution tables called objective histograms, which distribution tables are generated in the distribution generating means; and relation information generating means for generating relation information which shows relation between the frequency distribution correlation value and the orientation information.

24. The image processing apparatus according to claim 23, wherein the reference histogram is generated in accordance with the images corresponding to representative orientations of a plurality of orientations.

25. An image processing method comprising the steps of:

extracting a feature region from a region of an object in an image, in accordance with a luminance distribution of a plurality of pixels adjacent to a predetermined pixel;

extracting the predetermined pixel as a pixel existing in the feature region, when a dynamic range is greater than a predetermined value;

calculating a gravity-center correlation value that shows the correlation between the gravity center of the feature region and the gravity center of the image region of the object; and determining an orientation of the object from the gravity-center correlation value.

26. The image processing method according to claim 25, wherein the extracting step includes:

a pixel extracting step of extracting a plurality of pixels for detecting the dynamic range from the image region, in accordance with the position of the pixel of the predetermined pixel existing in the image region of the object; and a dynamic range calculating step of calculating the dynamic range of the pixels.

27. The image processing method according to claim 25, wherein the orientation of the object is determined in accordance with the relation information that shows a relation between the gravity-center correlation value and the orientation of the object.

28. The image processing method according to claim 25, wherein the gravity-center correlation value is calculated in accordance with the difference between a position of the gravity center of the feature region and the position of the gravity center of the image region of the object.

29. An image processing method comprising the steps of:

extracting a feature region from an image region of an object, in accordance with a luminance distribution of pixels adjacent to a predetermined pixel;

classifying each pixel included in the feature region into one of a plurality of classes;

generating an objective frequency distribution table which shows a frequency distribution of pixels in each class; and determining an orientation of the object in accordance with the objective frequency distribution table.

30. The image processing method according to claim 29, wherein the extracting step includes:

a pixel extracting step of extracting a plurality of pixels for detecting a dynamic range from the image region of the object, in accordance with the position of the predetermined pixel existing in the image region of the object;

a dynamic range calculating step of calculating the dynamic range of the extracted pixels; and a feature region extracting step for extracting the predetermined pixel in the feature region, when the dynamic range is greater than a predetermined value.

31. The image processing method according to claim 30, wherein in the orientation determining step calculates the gravity-center correlation value and a frequency of the objective distribution table in each class are calculated, weight coefficients are preset, and the orientation of the object is detected by adding the results of calculating.

32. The image processing method according to claim 31, wherein the operation is performed in accordance with the following equation:

$$\text{angle} = \sum_{i}^{\text{class number}} (\text{weight coefficient})_i \times (\text{gravity} - \text{centercorrelation value})_i \times (\text{frequency})_i$$

33. The image processing method according to claim 31, wherein the operation is performed in accordance with the following equation:

$$\text{angleV} = \sum_{i}^{\text{class number}} (W_{i1}, W_{i2}, W_{i3}, W_{i4}, W_{i5}, W_{i6}, W_{i7}) \times (C_i \times D_i, 1/(C_i \times D_i), D_i, C_i 1/D_i, 1/C_i, 1)$$

where wij is the weight coefficient for each class i (j is an integer), Ci is the gravity-center correlation value, Di is the frequency.

34. The image processing method according to claim 29, wherein the determining step includes:

a gravity-center calculating step of calculating the gravity center of a region of pixels which are classified, in each class;

an object-region gravity-center calculating step of calculating a gravity-center value of the image region of the object;

a gravity-center correlation calculating step of calculating a gravity-center correlation value in each class, which value shows correlation between the gravity center of the feature region and the image region of the object; and an orientation determining step of determining an orientation of the object, in accordance with the gravity-center correlation value in each class and the objective frequency distribution table.

35. The image processing method according to claim 29, wherein the determining step includes:

a frequency-distribution correlation value generating step of generating a frequency distribution correlation value which shows a correlation between the objective frequency distribution table and the reference frequency distribution table which shows a frequency of pixels in the feature region on each class in a representative orientation; and an orientation determining step of determining an orientation of the object in accordance with the frequency distribution correlation value.

36. The image processing method according to claim 35, wherein the orientation determining step includes:

a correlation-utilized orientation-determining step of determining the orientation of the object in accordance with the frequency distribution correlation value, by referring to the orientation information which shows a relation between the orientation of the object and the frequency distribution correlation value.

37. The image processing method according to claim 29, wherein the determination step includes:

a frequency-distribution correlation value generating step of generating frequency distribution correlation values which show the correlations between each objective frequency distribution table and the reference frequency distribution table which shows a frequency of pixels in the feature region in each class in each of a plurality of representative orientation; and an orientation determining step of determining an orientation of the object in accordance with the frequency distribution correlation values.

38. The image processing method according to claim 37, wherein the orientation determining step includes:

a correlation-utilizing orientation-determining step of determining the orientation of the object in accordance with the frequency distribution correlation values, by referring to the orientation information which shows relation between the orientation of the object and each of the frequency distribution correlation value of each representative orientation for determining an orientation.

39. The image processing method according to claim 37, wherein the orientation determining step includes:

a correlation-utilizing orientation-determining step of determining the orientation of the object in accordance with the frequency distribution correlation values, by referring to the orientation information which shows relation between the orientations of the object and the frequency distribution correlation values for determining an orientation.

40. An image processing method comprising the steps of:

determining an orientation of an object;

extracting a feature region from a region of an object in each image which corresponds to an orientation of the object, in accordance with a luminance distribution of a plurality of pixels adjacent to a predetermined pixel existing in each image;

extracting the predetermined pixel as a pixel existing in the feature region, when a dynamic range is greater than a predetermined value;

calculating a gravity-center correlation value that shows the correlation between the gravity center of the feature region and the gravity center of the region of the object in each image; and generating relation information which shows the relation between the gravity-center correlation value and an orientation of the object.

41. The image processing method according to claim 40, wherein the extracting step includes:

a pixel extracting step of extracting a plurality of pixels for detecting the dynamic range from the image region, in accordance with the position of the pixel of the predetermined pixel existing in the image region of the object; and a dynamic range calculating step of calculating the dynamic range of the pixels.

42. The image processing method according to claim 40, wherein in the calculating step, the gravity-center correlation value is calculated in accordance with the difference between a position of the gravity center of the feature region and the position of the gravity center of the image region of the object.

43. An image processing method comprising the steps of:
   determining an orientation of an object;
   extracting a feature region from a image region of the object in each image which corresponds to an orientation of the object, in accordance with a luminance distribution of a plurality of pixels corresponding to an predetermined pixel existing in each image;
   classifying each pixel existing in the feature region, into one of a plurality of classes;
   generating a reference frequency distribution table which is a frequency distribution of a number of pixels, which are classified in the classifying step, in each class;
   calculating a gravity center of an image region consisting of pixels in each class, which pixels are classified in the classifying step;
   calculating a gravity center of the image region of the object;
   calculating a gravity-center correlation value that shows correlation between the gravity center of the feature region and the gravity center of the region of the object in each class; and
   calculating relation information values in accordance with the gravity-center correlation information value of each class, the reference frequency distribution table and the orientation of the object.

44. The image processing method according to claim 43, wherein the extracting step includes:
   a pixel extracting step of extracting a plurality of pixels for detecting a dynamic range from the image region, in accordance with the position of the pixel of the predetermined pixel existing in the image region of the object;
   a dynamic range calculating step of calculating the dynamic range of the pixels; and
   a feature region extracting step of extracting the predetermined pixel as a pixel existing in the feature region, when the dynamic range is greater than a predetermined value.

45. The image processing method according to claim 44, wherein the operation is performed in accordance with the following equation:

$$\text{angle} = \sum_{i}^{class\ number} (\text{weight coefficient})_i \times (\text{gravity} - \text{centercorrelation value})_i \times (\text{frequency})_i$$

46. The image processing method according to claim 44, wherein the operation is performed in accordance with the following equation:

$$\text{angleV} = \sum_{i}^{class\ number} (W_{i1}, W_{i2}, W_{i3}, W_{i4}, W_{i5}, W_{i6}, W_{i7}) \times (C_i \times D_i, 1/(C_i \times D_i), D_i, C_i 1/D_i, 1/C_i, 1)$$

where wij is the weight coefficient for each class i (j is an integer), Ci is the gravity-center correlation value, Di is the frequency.

47. An image processing method comprising the steps of:
   acquiring images of an orientation of an object, in association with information about an orientation of the object;
   extracting a feature region from the image region of the object, for the orientation data, in accordance with a luminance distribution of a plurality of pixels corresponding to a predetermined pixel;
   classifying each pixel existing in the feature region into one of a plurality of classes;
   generating a frequency distribution table of a number of pixels, which pixels are classified in the classifying step, in each class;
   generating a frequency-distribution correlation value that shows correlation between one distribution table called a reference histogram and at least one of the other distribution tables called objective histograms, which distribution tables are generated in the distribution generating step; and
   generating relation information which shows relation between the frequency distribution correlation value and the orientation information.

48. The image processing method according to claim 47, wherein the reference histogram is generated in accordance with the images corresponding to representative orientations of a plurality of orientations.

49. A recording medium for storing a computer-controllable program, said computer-controllable program comprising the steps of:
   extracting a feature region from a region of an object in an image, in accordance with a luminance distribution of a plurality of pixels adjacent to a predetermined pixel;
   extracting the predetermined pixel as a pixel existing in the feature region, when a dynamic range is greater than a predetermined value;
   calculating a gravity-center correlation value that shows the correlation between the gravity center of the feature region and the gravity center of the image region of the object; and
   determining an orientation of the object from the gravity-center correlation value.

50. The recording medium according to claim 49, which stores a computer-controllable program, wherein the extracting step includes:
   a pixel extracting step of extracting a plurality of pixels for detecting the dynamic range from the image region, in accordance with the position of the pixel of the predetermined pixel existing in the image region of the object; and
   a dynamic range calculating step of calculating the dynamic range of the pixels.

51. The recording medium according to claim 49, which stores a computer-controllable program, wherein the gravity-center correlation value is calculated in accordance with the difference between a position of the gravity center of the feature region and the position of the gravity center of the image region of the object.

52. A recording medium for storing a computer-controllable program, said computer-controllable program comprising the steps of:
   extracting a feature region from an image region of an object, in accordance with a luminance distribution of pixels adjacent to a predetermined pixel;
   classifying each pixel included in the feature region into one of a plurality of classes;
   generating an objective frequency distribution table which shows a frequency distribution of pixels in each class; and
   determining an orientation of the object in accordance with the objective frequency distribution table.

53. The recording medium according to claim 52, which stores a computer-controllable program, wherein the extracting step includes:
   a pixel extracting step of extracting a plurality of pixels for detecting a dynamic range from the image region of the object, in accordance with the position of the predetermined pixel existing in the image region of the object;
   a dynamic range calculating step of calculating the dynamic range of the extracted pixels; and
   a feature region extracting step for extracting the predetermined pixel in the feature region, when the dynamic range is greater than a predetermined value.

54. The recording medium according to claim 52, which stores a computer-controllable program, wherein the determining step includes:
   a gravity-center calculating step of calculating the gravity center of a region of pixels which are classified, in each class;
   an object-region gravity-center calculating step of calculating a gravity-center value of the image region of the object;
   a gravity-center correlation calculating step of calculating a gravity-center correlation value in each class, which value shows correlation between the gravity center of the feature region and the image region of the object; and
   an orientation determining step of determining an orientation of the object, in accordance with the gravity-center correlation value in each class and the objective frequency distribution table.

55. The recording medium according to claim 54, which stores a computer-controllable program, wherein in the orientation determining step calculates the gravity-center correlation value and a frequency of the objective distribution table in each class are calculated, weight coefficients are preset, and the orientation of the object is detected by adding the results of calculating.

56. The recording medium according to claim 55, which stores a computer-controllable program, wherein the operation is performed in accordance with the following equation:

$$angle = \sum_{i}^{class\ number} (\text{weight coefficient})_i \times (\text{gravity−centercorrelation value})_i \times (\text{frequency})_i$$

57. The recording medium according to claim 55, which stores a computer-controllable program, wherein the operation is performed in accordance with the following equation:

$$angleV = \sum_{i}^{class\ number} (W_{i1}, W_{i2}, W_{i3}, W_{i4}, W_{i5}, W_{i6}, W_{i7}) \times (C_i \times D_i, 1/(C_i \times D_i), D_i, C_i 1/D_i, 1/C_i, 1)$$

where wij is the weight coefficient for each class i (j is an integer), Ci is the gravity-center correlation value, Di is the frequency.

58. The recording medium according to claim 55, which stores a computer-controllable program, wherein the determining step includes:
   a frequency-distribution correlation value generating step of generating a frequency distribution correlation value which shows a correlation between the objective frequency distribution table and the reference frequency distribution table which shows a frequency of pixels in the feature region on each class in a representative orientation; and
   an orientation determining step of determining an orientation of the object in accordance with the frequency distribution correlation value.

59. The recording medium according to claim 58, which stores a computer-controllable program, wherein the orientation determining step includes:
   a correlation-utilized orientation-determining step of determining the orientation of the object in accordance with the frequency distribution correlation value, by referring to the orientation information which shows a relation between the orientation of the object and the frequency distribution correlation value.

60. The recording medium according to claim 52, which stores a computer-controllable program, wherein the determination step includes:
   a frequency-distribution correlation value generating step of generating frequency distribution correlation values which show the correlations between each objective frequency distribution table and the reference frequency distribution table which shows a frequency of pixels in the feature region in each class in each of a plurality of representative orientation; and
   an orientation determining step of determining an orientation of the object in accordance with the frequency distribution correlation values.

61. The recording medium according to claim 60, which stores a computer-controllable program, wherein the orientation determining step includes:
   a correlation-utilizing orientation-determining step of determining the orientation of the object in accordance with the frequency distribution correlation values, by referring to the orientation information which shows relation between the orientation of the object and each of the frequency distribution correlation value of each representative orientation for determining an orientation.

62. The recording medium according to claim 60, which stores a computer-controllable program, wherein the orientation determining step includes:
   a correlation-utilizing orientation-determining step of determining the orientation of the object in accordance with the frequency distribution correlation values, by referring to the orientation information which shows relation between the orientations of the object and the frequency distribution correlation values for determining an orientation.

63. A recording medium for storing a computer-controllable program, said computer-controllable program comprising the steps of:

determining an orientation of an object;

extracting a feature region from a region of an object in each image which corresponds to an orientation of the object, in accordance with a luminance distribution of a plurality of pixels adjacent to a predetermined pixel existing in each image;

extracting the predetermined pixel in the feature region, when a dynamic range is greater than a predetermined value;

calculating a gravity-center correlation value that shows the correlation between the gravity center of the feature region and the gravity center of the region of the object in each image; and generating relation information which shows the relation between the gravity-center correlation value and an orientation of the object.

64. A recording medium for storing a computer-controllable program, said computer-controllable program comprising the steps of:

determining an orientation of an object;

extracting a feature region from an image region of the object in each image which corresponds to an orientation of the object, in accordance with a luminance distribution of a plurality of pixels corresponding to a predetermined pixel existing in each image;

classifying each pixel existing in the feature region, into one of a plurality of classes;

generating a reference frequency distribution table which is a frequency distribution of a number of pixels, which are classified in the classifying step, in each class;

calculating a gravity center of an image region consisting of pixels in each class, which pixels are classified in the classifying step;

calculating a gravity center of the image region of the object;

calculating a gravity-center correlation value that shows correlation between the gravity center of the feature region and the gravity center of the region of the object in each class; and calculating relation information values in accordance with the gravity-center correlation information value of each class, the reference frequency distribution table and the orientation of the object.

65. A recording medium for storing a computer-controllable program, said computer-controllable program comprising the steps of:

acquiring images of an orientation of an object, in association with information about an orientation of the object;

extracting a feature region from the image region of the object, for the orientation data, in accordance with a luminance distribution of a plurality of pixels corresponding to a predetermined pixel;

classifying each pixel existing in the feature region into one of a plurality of classes;

generating a frequency distribution table of a number of pixels, which pixels are classified in the classifying step, in each class;

generating a frequency-distribution correlation value that shows correlation between one distribution table called a reference histogram and at least one of the other distribution tables called objective histograms, which distribution tables are generated in the distribution generating step; and generating relation information which shows relation between the frequency distribution correlation value and the orientation information.

66. The recording medium according to claim 65, which stores a computer-controllable program, wherein the reference histogram is generated in accordance with the images corresponding to representative orientations of a plurality of orientations.

\* \* \* \* \*